(12) United States Patent
Otsuki et al.

(10) Patent No.: US 12,078,918 B2
(45) Date of Patent: Sep. 3, 2024

(54) PROJECTOR HAVING LIGHT MODULATION DEVICE AND REFLECTION MEMBER

(71) Applicant: SEIKO EPSON CORPORATION, Tokyo (JP)

(72) Inventors: Nobuyuki Otsuki, Matsumoto (JP); Hitoshi Hirano, Suwa (JP); Takanori Fukuyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 41 days.

(21) Appl. No.: 17/704,812

(22) Filed: Mar. 25, 2022

(65) Prior Publication Data
US 2022/0308429 A1    Sep. 29, 2022

(30) Foreign Application Priority Data
Mar. 26, 2021 (JP) ................. 2021-053457

(51) Int. Cl.
*G03B 21/28* (2006.01)
*G03B 21/14* (2006.01)

(52) U.S. Cl.
CPC ........... *G03B 21/28* (2013.01); *G03B 21/142* (2013.01)

(58) Field of Classification Search
CPC .............................. G03B 21/28; G03B 21/142
See application file for complete search history.

(56) References Cited

U.S. PATENT DOCUMENTS

| 7,780,296 B2 * | 8/2010 | Hisada ................... G03B 21/28 353/77 |
| 7,857,462 B2 * | 12/2010 | Hisada ................... G02B 13/16 353/77 |
| 8,254,039 B2 * | 8/2012 | Fujita ..................... G02B 17/08 353/98 |
| 9,372,388 B2 * | 6/2016 | Matsuo ................... H04N 9/315 |
| 9,785,043 B2 * | 10/2017 | Matsuo ............. G02B 17/0896 |
| 10,146,109 B2 * | 12/2018 | Takehana ............... G02B 13/04 |
| 10,310,366 B2 * | 6/2019 | Matsuo ................ H04N 9/3197 |
| 10,571,784 B2 * | 2/2020 | Hatano ................ G03B 21/208 |

(Continued)

FOREIGN PATENT DOCUMENTS

| JP | 2010-122573 A | 6/2010 |
| JP | 2011-075898 A | 4/2011 |

(Continued)

*Primary Examiner* — Bao-Luan Q Le
(74) *Attorney, Agent, or Firm* — Oliff PLC

(57) ABSTRACT

A projection optical device includes an incident side optical path on which image light is made incident from a image generation device, a bending member configured to bend the image light having passed through the incident side optical path, an emission side optical path on which the image light bent by the bending member is made incident, the emission side optical path being disposed side by side with the light source device, and a reflection element provided on the emission side optical path and configured to reflect the image light made incident thereon and project the image light to the outside of the exterior housing. The absolute value of f2/f1 satisfies the following expression when a focal length of the projection optical device is represented as f1 and a focal length of the reflection element is represented as f2. $4.0<|f2/f1|<20.0$.

10 Claims, 8 Drawing Sheets

(56) References Cited

U.S. PATENT DOCUMENTS

| | | | |
|---|---|---|---|
| 10,754,239 B2* | 8/2020 | Matsuo | G02B 13/18 |
| 10,761,415 B2* | 9/2020 | Matsuo | G02B 17/08 |
| 2006/0132723 A1* | 6/2006 | Yamagishi | G03B 21/28 |
| | | | 348/E5.139 |
| 2008/0158439 A1* | 7/2008 | Nishikawa | G02B 17/08 |
| | | | 359/651 |
| 2008/0218706 A1* | 9/2008 | Adachi | G03B 21/28 |
| | | | 353/98 |
| 2009/0059185 A1* | 3/2009 | Hisada | G02B 17/0852 |
| | | | 353/98 |
| 2009/0231555 A1* | 9/2009 | Nagarekawa | G03B 21/28 |
| | | | 359/730 |
| 2010/0053737 A1* | 3/2010 | Fujita | G02B 17/0852 |
| | | | 359/364 |
| 2010/0128234 A1* | 5/2010 | Nishikawa | G02B 17/0896 |
| | | | 353/101 |
| 2010/0157421 A1* | 6/2010 | Abe | G03B 21/28 |
| | | | 359/364 |
| 2010/0277703 A1* | 11/2010 | Hisada | G03B 21/28 |
| | | | 353/98 |
| 2011/0317135 A1* | 12/2011 | Nagarekawa | G03B 21/28 |
| | | | 353/99 |
| 2012/0120484 A1* | 5/2012 | Konuma | G02B 15/145 |
| | | | 359/364 |
| 2015/0293434 A1* | 10/2015 | Matsuo | G02B 17/08 |
| | | | 353/101 |
| 2016/0370691 A1* | 12/2016 | Takehana | G02B 7/04 |
| 2017/0332057 A1* | 11/2017 | Matsuo | G03B 21/147 |
| 2017/0371126 A1* | 12/2017 | Takehana | G03B 21/142 |
| 2018/0017758 A1* | 1/2018 | Takehana | G03B 21/147 |
| 2018/0046068 A1* | 2/2018 | Hatano | G02B 15/144 |
| 2018/0059526 A1* | 3/2018 | Takehana | H04N 9/315 |
| 2019/0137853 A1* | 5/2019 | Takehana | G02B 7/04 |

FOREIGN PATENT DOCUMENTS

| | | |
|---|---|---|
| JP | 2012-108267 A | 6/2012 |
| JP | 2013-008044 A | 1/2013 |

* cited by examiner

PROJECTOR HAVING LIGHT MODULATION DEVICE AND REFLECTION MEMBER The present application is based on, and claims priority from JP Application Serial Number 2021-053457, filed Mar. 26, 2021, the disclosure of which is hereby incorporated by reference herein in its entirety.

BACKGROUND

1. Technical Field

The present disclosure relates to a projector.

2. Related Art

There has been known a projection-type display device including a light source, a return mirror, a video display element, and a projection optical unit (see, for example, JP-A-2013-8044 (Patent Literature 1)).

In the projection-type display device described in Patent Literature 1, the projection optical unit includes a front lens group, a rear lens group, and a free curved surface mirror and the return mirror is disposed between the front lens group and the rear lens group. Light emitted from the light source is made incident on the video display element and modulated. Image light modulated by the video display element passes through the front lens group and, thereafter, is bent by the return mirror. The image light bent by the return mirror passes through the rear lens group and is made incident on the free curved surface mirror. The free curved surface mirror reflects and projects the incident image light. The image light reflected by the free curved surface mirror can be projected onto, for example, the same surface as a placing surface on which the projection-type display device is placed. Such a projection-type display device capable of displaying a large image even if a projection distance of the image light is short is called short focus-type projector.

There has been known a projector in which a light source and an optical system unit are juxtaposed and an optical path of light emitted from the light source and meandering is provided on the inside (see, for example, JP-A-2011-75398 (Patent Literature 2)).

In the projector described in Patent Literature 2, the light source includes a blue light source and a red light source. Blue excited light emitted from the blue light source is reflected to the front side by a reflection mirror group and, thereafter, passes through a first dichroic mirror and is made incident on a fluorescent light emitting device. Of blue light and green light emitted from the fluorescent light emitting device, the blue light passes through the fluorescent light emitting device, thereafter, is reflected to the back side by a first reflection mirror and a second reflection mirror, and, thereafter, passes through a second dichroic mirror. The green light, is reflected by the first dichroic mirror and reflected to the back side by the second dichroic mirror. Red light emitted from a red light source device and having passed through the first, dichroic mirror is reflected to the back side by the second dichroic mirror. The blue light having passed through the second dichroic mirror to the back side and the green light and the red light reflected to the back side by the second dichroic mirror are made incident on an irradiation mirror via an optical axis conversion mirror and a condensing lens and made incident on a display element via the irradiation mirror. Image light emitted to the front side from the display element is projected to the outside of the projector by the optical system unit.

In recent years, there has been a demand for a reduction in the size of a projector.

In response to the demand, it is conceived to achieve a reduction in the size of the short focus-type projector by juxtaposing the light source device and the projection optical device, which configure the short focus-type projector, like the light source and the optical system unit of the projector described in Patent Literature 2.

However, the light source device is a relatively large device among the devices configuring the projector. Therefore, when the projector is reduced in size, a part of the light source device tends to be present within a projection range of image light by the projection optical device and a part or the image light tends to be blocked by the light source device. Accordingly, it is necessary to dispose the light source device apart from the projection optical device. Therefore, it is difficult to reduce the projector in size.

SUMMARY

A projector according to an aspect of the present disclosure includes: a light source device configured to emit light in a first direction; an image generation device including a light modulation device configured to modulate incident light, the image generation device modulating light made incident in the first direction from the light source device to generate image light and emitting the image light in a second direction crossing the first direction; a projection optical device configured to project the image light made incident along the second direction from the image generation device; and an exterior housing housing the light source device, the image generation device, and the projection optical device. The projection optical device includes: an incident side optical path on which the image light is made incident along the second direction from the image generation device; a bending member configured to bend, in an opposite direction of the first direction, the image light having passed through the incident side optical path; an emission side optical path on which the image light bent by the bending member is made incident along the opposite direction of the first direction, the emission side optical path being disposed side by side with the light source device in the second direction; and a reflection element provided on the emission side optical path and configured to reflect the image light made incident thereon and project the image light to an outside of the exterior housing. An absolute value of f2/f1 satisfies $4.0 < |f2/f1| 20.0$, where f1 represents a focal length of the projection optical device that forms an image on the light modulation device and projects the image light and f2 represents a focal length of the reflection element.

DESCRIPTION OF EXEMPLARY EMBODIMENTS

An embodiment of the present disclosure is explained below with reference to the drawings.

Schematic Configuration of a Projector

Figure 1:
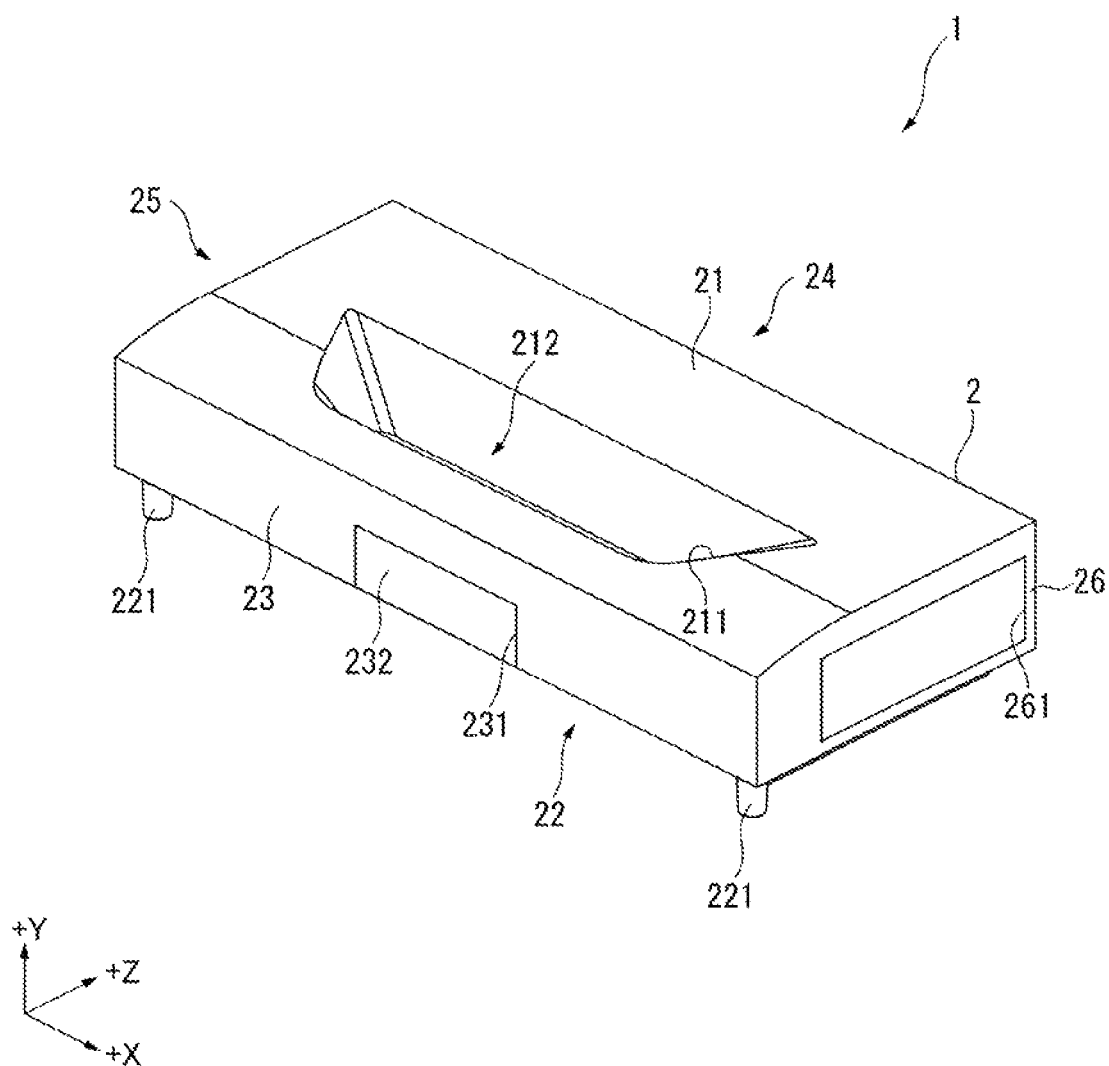
FIG. 1 is a perspective view showing a projector in an embodiment.
Figure 2:
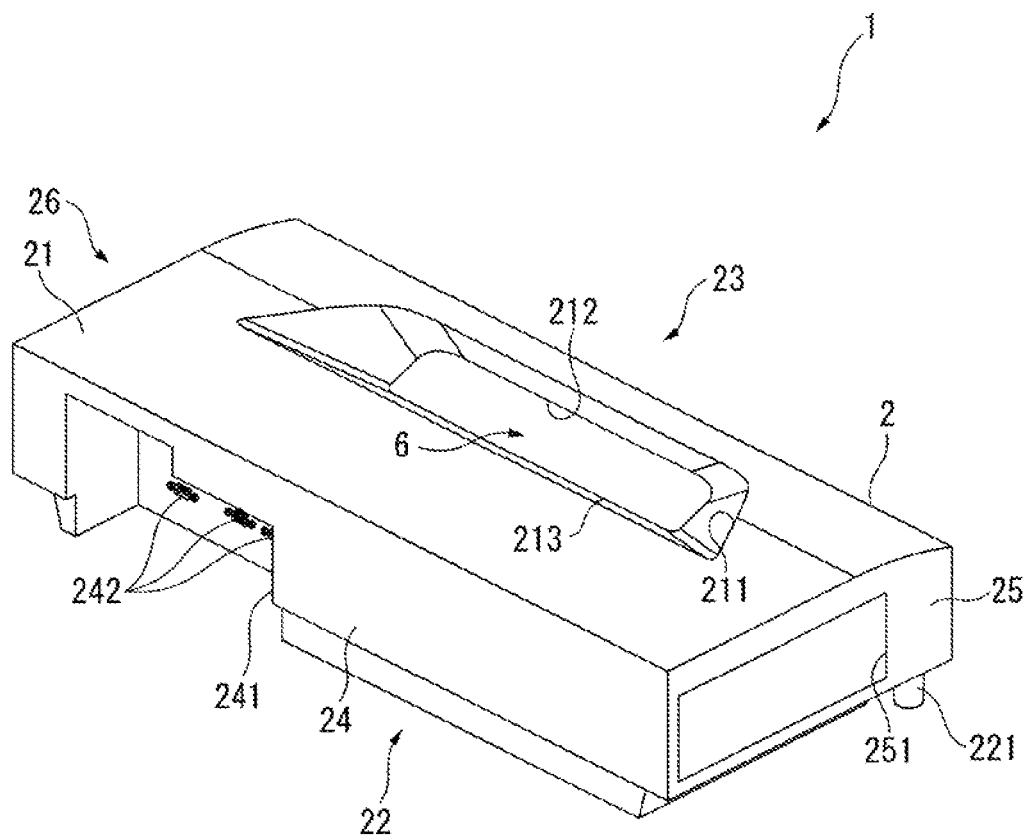
FIG. 2 is a perspective view showing the projector in the embodiment.
Figure 2:
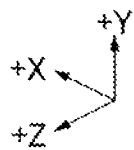

FIGS. 1 and 2 are perspective views showing the exterior of a projector 1 according to this embodiment. Specifically, FIG. 1 is a perspective view of the projector 1 viewed from a front surface 23 side and FIG. 2 is a perspective view of the projector 1 viewed from a rear surface 24 side.

The projector 1 according to this embodiment is a projection device that modulates light emitted from a light source to generate image light corresponding to image information and projects the generated image light onto a projection surface such as a screen. The projector 1 includes, as shown in FIGS. 1 and 2, an exterior housing 2 configuring the exterior of the projector 1.

Configuration of the Exterior Housing

The exterior housing 2 houses, on the inside, a control device CD, a power supply device PS, an image projection device 3, a supporting member 7, a position adjustment device 8, and a net-shown cooling device explained below. The exterior housing 2 is formed in a substantially rectangular parallelepiped shape and includes a top surface 21, a bottom surface 22, a front surface 23, a rear surface 24, a left side surface 25, and a right side surface 26.

In the following explanation, three directions orthogonal to one another are represented as a +X direction, a +Y direction, and a +Z direction. The +X direction is a direction from the left side surface 25 toward the right side surface 26. The +Y direction is a direction from the bottom surface 22 toward the top surface 21. The +Z direction is a direction from the front surface 23 toward the rear surface 24. Although not shown in the figures, the opposite direction of the +X direction is represented as a −X direction, the opposite direction of the +Y direction is represented as a −Y direction, and the opposite direction of the direction is represented as a −Z direction.

The top surface 21 and the bottom surface 22 are surfaces on the opposite sides each other in the +Y direction.

The top surface 21 is equivalent to a first surface disposed in a reflecting direction of image light by a reflection element 67 explained below. The top surface 21 is a surface facing in the upward direction when the projector 1 is placed on a placing surface. The top surface 21 includes a recess 211 recessed to the bottom surface 22 side and a projection opening 212 provided in the bottom of the recess 211. The projection opening 212 is an opening section through which image light projected from a projection optical device 6 explained below passes.

The bottom surface 22 is equivalent to a second surface disposed on the opposite side of the top surface 21. The bottom surface 22 includes a plurality of leg sections 221 that are in contact with a setting surface. A posture of the projector 1 at the time when the projector 1 placed to direct the top surface 21 upward projects image light to the rear surface 24 side and upward from the top surface 21 is referred to as first projection posture.

The front surface 23 and the rear surface 24 are surfaces on the opposite sides each other in the +Z direction.

The rear surface 24 includes, as shown in FIG. 2, a recess 241 recessed to the front surface 23 side and a plurality of terminals 242 provided in the bottom of the recess 241.

The left side surface 25 and the right side surface 26 are surfaces on the opposite sides each other in the +X direction.

The left side surface 25 includes an opening section 251. In this embodiment, the opening section 251 functions as an exhaust pert for discharging a cooling gas that has cooled cooling targets in the exterior housing 2.

The right side surface 26 includes an opening section 261 as shown in FIG. 1. In this embodiment, the opening section 261 functions as an introducing port for introducing gas on the outside of the exterior housing 2 into the inside of the exterior housing 2 as a cooling gas. Although not shown in FIG. 1, a filter for removing dust included in air passing through the opening section 261 is provided in the opening section 261.

Figure 3:
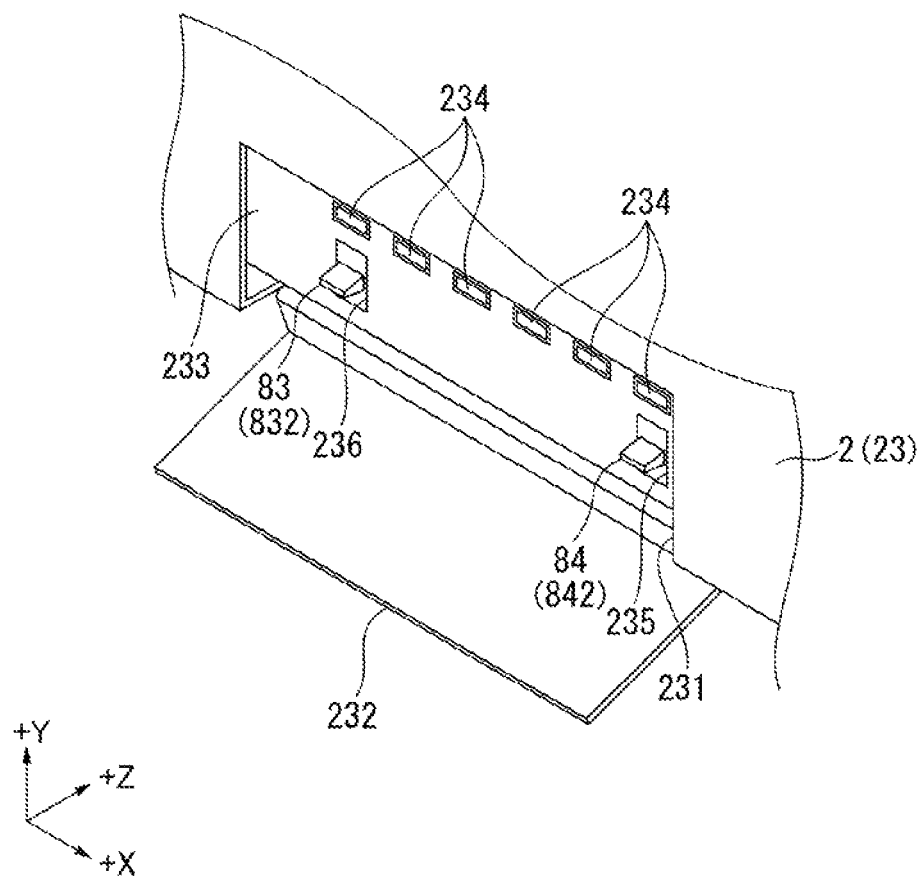
FIG. 3 is a perspective view showing an operation section in the embodiment.

FIG. 3 is an enlarged perspective view showing an operation section 233 provided on the front surface 23. Specifically, FIG. 3 is a perspective view showing the operation section 233 exposed by turning a cover member 232.

The front surface 23 includes, as shown in FIGS. 1 and 3, a recess 231 recessed to the rear surface 24 side and the cover member 232 and includes, as shown in FIG. 3, the operation section 233 provided in the bottom of the recess 231.

The cover member 232 is provided to be capable of turning centering on an axis extending along the +X direction. The cover member 232 is turned in one direction to thereby open the recess 231 and is turned in the other direction to thereby close the recess 231.

The operation section 233 is exposed by opening the recess 231. The operation section 233 includes a plurality of operation buttons 234 and opening sections for operation 235 and 236.

When being pressed by a user, the plurality of operation buttons 234 output operation signals allocated to the operation buttons 234 in advance to the control device CD explained below.

The opening section for operation 235 is provided in a rectangular shape long in the +Y direction in a position in the +X direction in the operation section 233. The opening section for operation 235 exposes an operation section 842 of a second operation member 84 configuring the position adjustment device 8 explained below.

The opening section for operation 236 is provided in a rectangular shape long in the +Y direction in a position in the −X direction in the operation section 233. The opening section for operation 236 exposes an operation section 832 of a first operation member 83 configuring the position adjustment device 8 explained below.

Internal Configuration of the Projector

Figure 4:
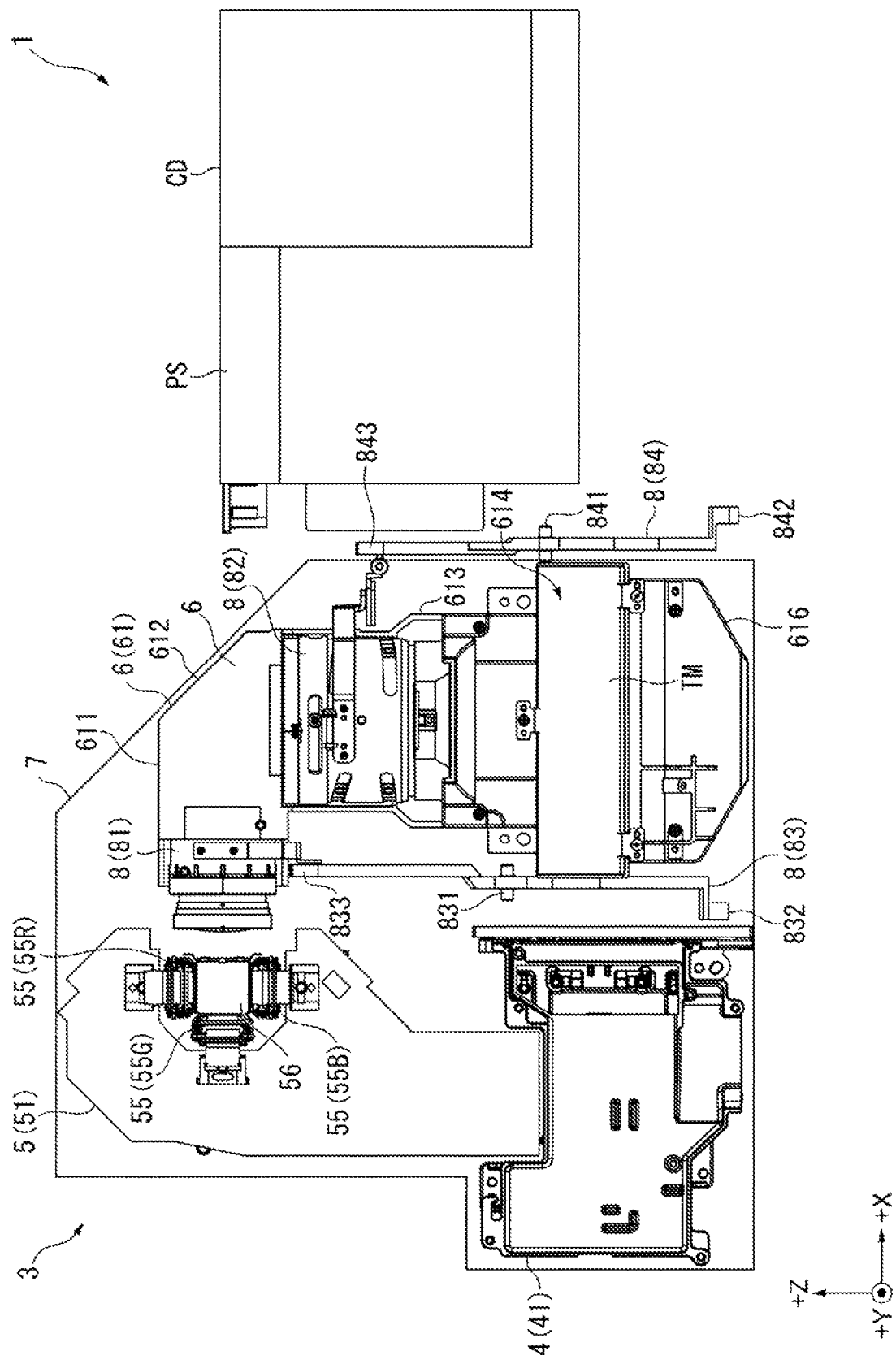
FIG. 4 is a plan view showing the internal configuration of the projector in the embodiment.

FIG. 4 is a plan view of the internal configuration of the projector 1 viewed from the +Y direction.

The projector 1 includes, as shown in FIG. 4, the control device CD, the power supply device PS, the image projection device 3, the supporting member 7, and the position adjustment device 6 housed in the exterior housing 2. Besides, although not shown in FIG. 4, the projector 1 includes a cooling device that cools cooling targets such as the control device CD, the power supply device PS, and the image projection device 3.

Configurations of the Control Device and the Power Supply Device

The control device CD is a circuit board on which an arithmetic processing circuit such as a CPU (Central Processing Unit) is provided. The control device CD controls the operation of the projector 1.

The power supply device PS supplies electric power to electronic components configuring the projector 1. The power supply device PS transforms electric power supplied from the outside and supplies the transformed electric power to the electronic components. In this embodiment, the power supply device PS is configured as a circuit board on which a circuit element such as a transformer is provided.

The control device CD and the power supply device PS are disposed adjacent to, in the direction, a projection optical device 6 located in the center of the exterior housing 2 on the inside of the exterior housing 2. That is, the control device CD and the power supply device PS are provided on the opposite side of a light source device 4 and an image generation device 5, which configure the image projection device 3, with respect to the projection optical device 6 on the inside of the exterior housing 2. Therefore, the light source device 4, the projection optical device 6, the control device CD, and the power supply device PS explained below are disposed side by side in the +X direction. In other words, a direction in which the light source device 4, the projection optical device 6, the control device CD, and the power supply device PS are disposed side by side is a direction along the +X direction.

Configuration of the Image Projection Device

Figure 5:
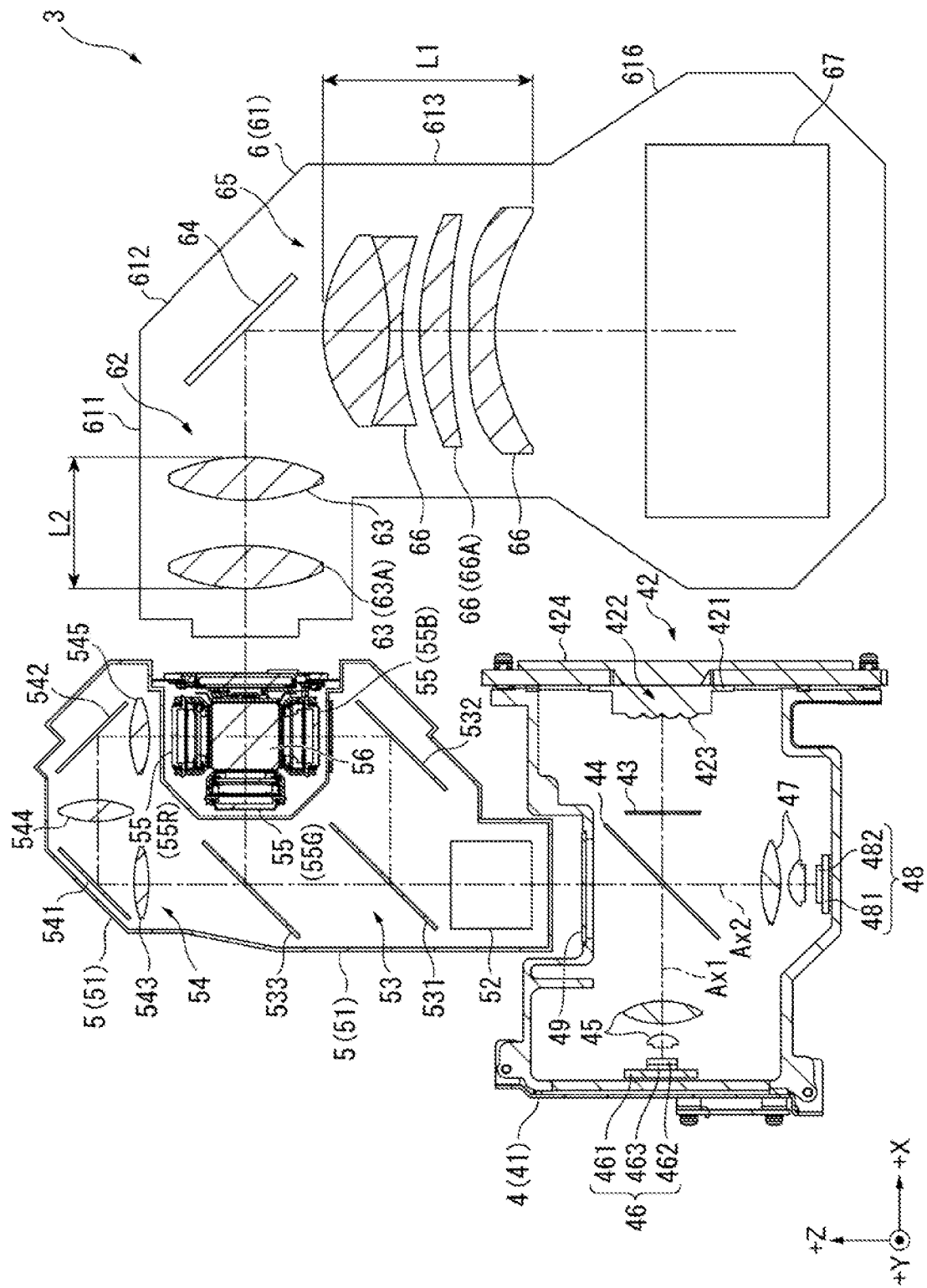
FIG. 5 is a schematic diagram showing the configuration of an image projection device in the embodiment.

FIG. 5 is a schematic diagram showing the configuration of the image projection device 3. In FIG. 5, illustration of the position adjustment device 8 is omitted.

The image projection device 3 generates image light corresponding to an image signal input from the control device CD and projects the generated image light. The image projection device 3 includes, as shown in FIGS. 4 and 5, the light source device 4, the image generation device 5, and the projection optical device 6.

The light source device 4 and the image generation device 5 are disposed adjacent to, in the −X direction, the projection optical device 6 located in the center of the exterior housing 2 on the inside of the exterior housing 2. That is, the right source device 4 and the projection optical device 6 are adjacent to each other in the +X direction.

Configuration of the Light Source Device

The light source device 4 emits illumination light to the image generation device 5. The light scarce device 4 includes, as shown in FIG. 5, a light source housing 41, a light source section 42, a diffusing and transmitting section 43, a light separating section 44, a first condensing element 45, a wavelength conversion element 46, a second condensing element 47, a diffusing and reflecting element 48, and a phase difference section 49.

Configuration of the Light Source Housing

The light source housing 41 houses the light source section 42, the diffusing and transmitting section 43, the light separating section 44, the first condensing element 45, the wavelength conversion element 46, the second condensing element 47, the diffusing and reflecting element 48, and the phase difference section 49. An illumination optical axis Ax1 along the +X direction and an illumination optical axis Ax2 along the +Z direction are provided in the light source housing 41. The illumination optical axis Ax1 and the illumination optical axis Ax2 cross.

The light source section 42, the diffusing and transmitting section 43, the light separating section 44, the first condensing element 45, and the wavelength conversion element 46 are disposed on the illumination optical axis Ax1.

The diffusing and reflecting element 46, the second condensing element 47, the light separating section 44, the phase difference section 49 are disposed on the illumination optical axis Ax2. That is, the light separating section 44 is disposed in a crossing section of the illumination optical axis Ax1 and the illumination optical axis Ax2.

Configuration of the Light Source Section

The light source section 42 emits light in the −X direction. The light source section 42 includes a supporting member 421, a plurality of solid-state light emitting elements 422, which are light sources, and a plurality of collimator lenses 423.

The supporting member 421 supports the plurality of solid-state light emitting elements 422 respectively disposed in an array shape on a plane orthogonal to the illumination optical axis Ax1. The supporting member 421 is a member made of metal. The heat of the plurality of solid-state light emitting elements 422 is transmitted to the supporting member 421.

Each of the plurality of solid-state light emitting elements 422 emits blue light of s-polarized light in the +Z-direction. The solid-state light emitting element 422 is a semiconductor laser. The blue light emitted by the solid-state light emitting element 422 is laser light having a peak wavelength of, for example, 440 nm.

The plurality of collimator lenses 423 are provided to correspond to the plurality of solid-state light emitting elements 422. The plurality of collimator lenses 423 convert the blue light emitted from the plurality of solid-state light emitting elements 422 into a parallel light beam and make the parallel light beam incident on the diffusing and transmitting section 43.

In this way, the light source section 42 emits the blue light, which is linearly polarized light having the same polarization direction. However, not only this, but the light source section 42 may be configured to emit blue light of p-polarized light or may be configured to emit the blue light of the s-polarized light and the blue light of the p-polarized light.

Figure 6:
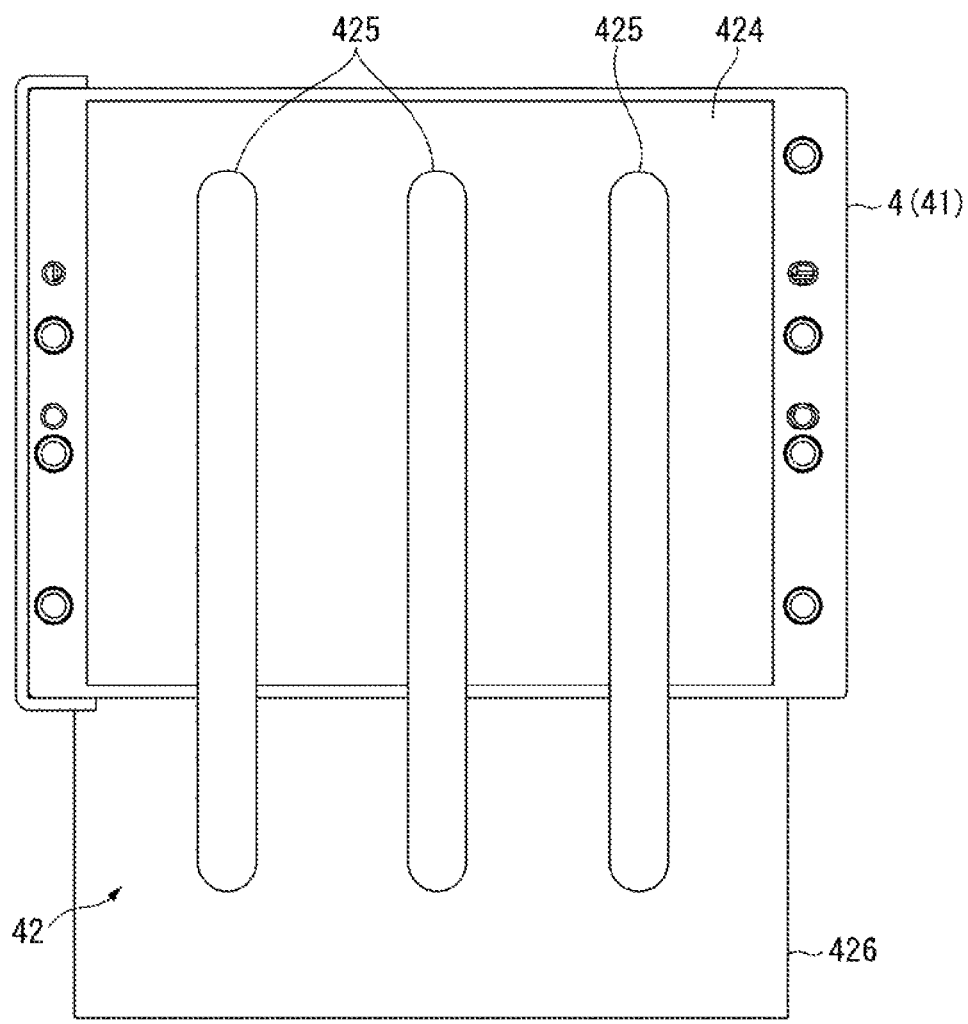
FIG. 6 is a side view showing a light source device in the embodiment.

FIG. 6 is a side view showing the light source device 4.

The light source section 42 includes, besides the components explained above, as shown in FIG. 6, a heat receiving member 424, heat pipes 425, and a heat radiating member 426.

The heat receiving member 424 is provided on the opposite side of a light emission side of the plurality of solid-state light emitting elements 422, that is, in the +X direction with respect to the plurality of solid-state light emitting elements 422. The heat receiving member 424 is coupled to the supporting member 421 to be capable of transmitting heat and receives the heat of the plurality of solid-state light emitting elements 422 transmitted to the supporting member 421.

The heat pipes 425 couples the heat receiving member 424 and the heat radiating member 426 to be capable of transmitting heat and transmit the heat transmitted to the heat receiving member 424 to the heat radiating member 426. The number of heat pipes 425 is not limited to three and can be changed as appropriate.

The heat radiating member 426 is a heat sink including a plurality of fins. The heat radiating member 426 radiates heat transmitted from the heat receiving member 424 via the heat pipes 425. The heat radiating member 426 is cooled by a cooling gas circulated by a fan configuring the not-shown cooling device, whereby the plurality of sold-state light emitting elements 422 are cooled. In this embodiment, the heat radiating member 426 is provided in the −Y direction with respect to the light, source housing 41. That is, the heat radiating member 426 is provided in the −Y direction with respect to the solid-state light emitting element 422, which is a light source. However, the heat radiating member 426 may be provided in the +Y direction with respect to the light source housing 41.

Configuration of the Diffusing and Transmitting Section

The diffusing and transmitting section 43 shown in FIG. 5 diffuses light made incident thereon and uniformizes an illuminance distribution of light to be emitted. As the diffusing and transmitting section 43, a configuration including a hologram, a configuration in which a plurality of small lenses are arrayed on an optical axis orthogonal surface, and a configuration in which a light passing surface is a rough surface can be illustrated.

Instead of the diffusing and transmitting section 43, a homogenizer optical element including a pair of multi-lens arrays may be adopted in the light source device 4. On the other hand, when the diffusing and transmitting section 43 is adopted, compared with when the homogenizer optical element is adopted, it is possible to reduce the distance from the light source section 42 to the light separating section 44. An afocal optical element may be provided between the light source section 42 and the diffusing and transmitting section 43. The afocal optical element reduces the diameter of a light beam made incident from the light source section 42 and, thereafter, collimates and emits the light beam.

Configuration of the Light Separating Section

Light emitted from the diffusing and transmitting section 43 is made incident on the light separating section 44.

The light separating section 44 has a function of a half mirror for allowing a part of light made incident from the light source section 42 via the diffusing and transmitting section 43 to pass and reflecting the other part of the light. The light separating section 44 has a function of a dichroic mirror for allowing blue light made incident from the diffusing and reflecting element 48 to pass and reflecting light made incident from the wavelength conversion element 46 and having a wavelength longer than the wavelength of the blue light.

Specifically, the light separating section 44 allows first partial light, which is a part of the blue light made incident from the diffusing and transmitting section 43, to pass and makes the first partial light incident on the first condensing element 45 and reflects second partial light, which is the other part of the blue light, and makes the second partial light incident on the second condensing element 47.

In this embodiment, considering absorption of light in the wavelength conversion element 46, the light separating section 44 sets a light amount of the first partial light made incident on the wavelength conversion element 46 larger than a light amount of the second partial light made incident on the diffusing and reflecting element 48. However, not only this, but the light amount of the first partial light may be the same as the light amount of the second partial light or may be smaller than the light amount of the second partial light.

The light separating section 44 may have a function of a polarization separation element for reflecting an s-polarized light component and transmitting a p-polarized light component in light made incident thereon and a function of a dichroic mirror for transmitting blue light and reflecting color lights having wavelengths longer than the wavelength of the blue light.

Configuration of the First Condensing Element

The first condensing element 45 condenses, in the wavelength conversion element 46, the first partial light having passed through the light separating section 44. The first condensing element 45 collimates light made incident from the wavelength conversion element 46.

In this embodiment, the first condensing element 45 includes two lenses. However, the number of lenses configuring the first condensing element 45 is not limited to two.

Configuration of the Wavelength Conversion Element

The wavelength conversion element 46 diffuses and emits light obtained by converting the wavelength of light made incident thereon in the opposite direction of an incident direction of the incident light. Specifically, the wavelength conversion element 46 is excited by incidence of blue light and diffuses and emits fluorescent light having a wavelength longer than the wavelength of the incident blue light toward the first condensing element 45. That is, the wavelength conversion element 46 converts light having a first wavelength band emitted from the light source section 42 into light having a second wavelength band different from the first wavelength band. The light emitted from the wavelength conversion element 46 is, for example, fluorescent light having a peak wavelength of 500 to 700 nm.

The wavelength conversion element 46 includes a substrate 461, a wavelength conversion layer 462, and a reflection layer 463.

The substrate 461 is a plate-like body formed of metal and supports the wavelength conversion layer 462 and the reflection layer 463. The substrate 461 is fixed to the light source housing 41 and transmits, to the light source housing 41, heat transmitted from the wavelength conversion layer 462.

The wavelength conversion layer 462 is provided in a position opposed to the first condensing element 45 in the substrate 461. The wavelength conversion layer 462 is a phosphor layer including a phosphor that diffuses and emits fluorescent light, which is nonpolarized light obtained by converting the wavelength of the blue light made incident from the first condensing element 45.

The reflection layer 463 is located on the opposite side of an incident side of the blue light with respect to the wavelength conversion layer 462 and reflects the fluorescent light made incident from the wavelength conversion layer 462 to the wavelength conversion layer 462 side.

The fluorescent light emitted from the wavelength conversion element 46 passes through the first condensing element 45 in the +X direction along the illumination optical axis Ax1 and, thereafter, is made incident on the light separating section 44. The fluorescent light made incident on the light separating section 44 is reflected in the +Z direction by the light separating section 44 and made incident on the phase difference section 49.

Configuration of the Second Condensing Element

The second condensing element 47 condenses, in the diffusing and reflecting element 48, the second partial light reflected by the light separating section 44 and made incident thereon. The second condensing element 47 collimates the blue light made incident from the diffusing and reflecting element 48.

In this embodiment, like the first condensing element 45, the second condensing element 47 includes two lenses. However, the number of lenses configuring the second condensing element 47 is not limited to two.

Configuration of the Diffusing and Reflecting Element

The diffusing and reflecting element 48 includes a substrate 481 and a diffusion and reflection layer 482 provided in a position opposed to the second condensing element 47 in the substrate 481.

The diffusion and reflection layer 482 reflects and diffuses the blue light made incident from the second condensing element 47 at the same diffusion angle as the diffusion angle of the fluorescent light emitted from the wavelength conversion element 46. That is, the diffusion and reflection layer 482 does not convert the wavelength of light made incident thereon and reflects and diffuses the incident light.

The blue light reflected on the diffusion and reflection layer 482 passes through the second condensing element 47 and, thereafter, passes through the light separating section 44 and is made incident on the phase difference section 49. That is, the light made incident on the phase difference section 49 from the light separating section 44 is white light in which the blue light and the fluorescent light are mixed.

Configuration of the Phase Difference Section

The phase difference section 49 converts the white light made incident from the light separating section 44 into light in which s-polarized light and p-polarized light are mixed. White illumination light converted in this way is made incident on a uniformizing device 52. That is, the light source device 4 emits the illumination light in the +Z direction. The +Z direction is equivalent to the first direction.

Configuration of the Image Generation Device

The image generation device 5 generates an image from the illumination light made incident from the light source device 4. Specifically, the image generation device 5 modulates light made incident from the light source device 4 and generates image light corresponding to an image signal input from the control device CD.

The image generation device 5 includes a housing 51, the uniformizing device 52, a color separation device 53, a relay device 54, a light modulation device 55, and a color combining element 56.

Configurations of the Housing and the Uniformizing device

The housing 51 houses the uniformizing device 52, the color separation device 53, and the relay device 54. An illumination optical axis, which is an optical axis in design, is set in the image generation device 5. The housing 51 holds the uniformizing device 52, the color separation device 53, and the relay device 54 on the illumination optical axis. The light modulation device 55 and the color combining element 55 are disposed on the illumination optical axis.

The uniformizing device 52 uniformizes the illuminance of the illumination light made incident from the light source device 4 and makes a polarization state of the illumination light uniform. The illumination light, the illuminance of which is uniformized by the uniformizing device 52, illuminates a modulation region of the light modulation device 55 through the color separation device 53 and the relay device 54. Although detailed illustration is omitted, the uniformizing device 52 includes a pair of lens arrays for uniformizing illuminance, a polarization conversion element having a polarization state, and a superimposition lens for superimposing, on the modulation region, a plurality of partial light beams divided by the pair of lens arrays. The illumination light having passed through the uniformizing device 52 is, for example, linear polarized light of s-polarized light.

Configuration of the Color Separation Device

The color separation device 53 separates the illumination light made incident from the uniformizing device 52 into blue light, green light, and red light. The color separation device 53 includes a first color separation element 531, a first reflection element 532, and a second color separation element 533.

The first color separation element 531 is disposed in the +Z direction with respect to the uniformizing device 52. The first color separation element 531 reflects, in the +X direction, the blue light included in the illumination light made incident from the uniformizing device 52, transmits the green light and the red light included in the illumination light in the +Z direction, and separates the blue light from the green light and the red light.

The first reflection element 532 reflects, in the +Z direction, the blue light reflected in the +X direction by the first color separation element 531. The blue light reflected by the first reflection element 532 is made incident on a light modulation element for blue 55B.

The second color separation element 533 is disposed in the +Z direction with respect to the first color separation element 531. Of the green light and the red light transmitted through the first color separation element 531, the second color separation element 533 reflects the green light in the +X direction, transmits the red light in the +Z direction, and separates the green light and the red light.

The green light separated by the second color separation element 533 is made incident on a light modulation element for green 55G. The red light separated by the second color separation element 533 is made incident on the relay device 54.

Configuration of the Relay Device

The relay device 54 is provided on an optical path of the red light longer than an optical path of the blue light and an optical path of the green light and suppresses a loss of the red light. The relay device 54 includes a second reflection element 541, a third reflection element 542, an incident side lens 543, a relay lens 544, and an emission side lens 545.

The second reflection element 541 reflects, in the +X direction, the red light transmitted through the second color separation element 533 in the +Z direction. The third reflection element 542 reflects, in the −Z direction, the red light reflected by the second reflection element 541. The incident side lens 543 is disposed between the second color separation element 533 and the second reflection element 541. The relay lens 544 is disposed between the second reflection element 541 and the third reflection element 542. The emission side lens 545 is disposed between the second reflection element 541 and a light modulation element for red 55R.

In this embodiment/the relay device 54 is provided on the optical path of the red light. However, not only this, but, for example, color light having an optical path longer than the optical paths of the other color lights may be the blue light and the relay device 54 may be provided on the optical path of the blue light.

Configuration of the Light Modulation Device

The light modulation device 55 modulates, according to an image signal, light made incident thereon. The light modulation device 55 includes the light modulation element for blue 55B, the light modulation element for green 55G, and the light modulation element for red 55R.

The light modulation element for blue 55B modulates the blue light made incident in the +Z direction from the first reflection element 532. The blue light modulated by the light modulation element for blue 55B travels in the +Z direction and is made incident on the color combining element 56.

The light modulation element for green 55G modulates the green light made incident in the −X direction from the second color separation element 533. The green light modulated by the light modulation element for green 55G travels in the +X direction and is made incident on the color combining element 56.

The light modulation element for red 55R modulates the red light made incident in the −Z direction from the emission side lens 54S. The red light modulated by the light modulation element for red 55R travels in the −Z direction and is made incident on the color combining element 56.

In this embodiment, each of the color modulation elements 55B, 55G, and 55R includes a transmissive liquid crystal panel and a pair of polarizing plates sandwiching the transmissive liquid crystal panel.

Configuration of the Color Combining Element

The color combining element 56 combines the blue light modulated by the light, modulation element for blue 55R, the green light modulated by the light modulation element for green 55G, and the red light modulated by the light modulation element for red 55R to generate image light. Specifically, the color combining element 56 reflects, in the +X direction, the blue light made incident in the +Z direction from the light modulation element for blue 55B, transmits, in the +X direction, the green light made incident in the +X direction from the light modulation element for green 55G, and reflects, in the +X direction, the red light made incident in the −Z direction from the light modulation element for red 55R. The image light, which is combined light combined by the color combining element 56, is emitted in the +X direction along a light emission optical axis of the color combining element 56, that is, a light emission optical axis of the image generation device 5 and is made incident on the projection optical device 6.

In this embodiment, the color combining element 56 is configured by a cross dichroic prism. However, not only this, but the color combining element 56 can also be configured by a plurality of dichroic mirrors.

In this way, the image generation device 5 modulates light made incident in the Z direction from the light source device 4 to generate image light and emits the image light in the +X direction crossing the +Z direction. The +X direction is equivalent to the second direction.

Configuration of the Projection Optical Device

The projection optical device 6 projects, onto the projection surface, image light generated by the image generation device 5 and made incident from the image generation device 5. That is, the projection optical device 6 projects light modulated by the light modulation device 55.

The projection optical device 6 is a projection optical system including a lens housing 61, an incident side optical path 62, an incident side lens group 63, a bending member 64, an emission side optical path 65, an emission side lens group 66, and a reflection element 67.

The lens housing 61 is equivalent to an projection optical device housing. The lens housing 61 is a lens barrel formed in a reverse L shape when viewed from the +Y direction to extend in the +X direction from an incident section 611 side and, thereafter, bend in the −Z direction in a bending section 612. The lens housing 61 includes the incident section 611, the bending section 612, an emission section 613, and a projecting section 616.

The incident section 611 is a part extending in the +X direction in the lens housing 61 as shown in FIG. 5. The incident side optical path 62 is provided on the inside of the incident section 611.

The incident side optical path 62 is an optical path on which image light is made incident in the +X direction from the image generation device 5. The incident side lens group 63 is provided on the incident side optical path 62. That is, the projection optical device 6 includes the incident side lens group 63 disposed on the incident side optical path 62. The number of lenses configuring the incident side lens group 63 can be set as appropriate.

The incident side lens group 63 is equivalent to an incident side refraction system lens group. In this embodiment, the incident side lens group 63 includes a focus lens 63A functioning as an optical adjustment lens. The focus lens 63A adjusts a focus state of an image projected onto the projection surface. The first operation member 83 explained below is operated by the user, whereby the focus lens 63A is moved along an optical axis of the incident side lens group 63.

The bending section 612 is a part connecting the incident section 611 and the emission section 613 and is a part for bending, in the −Z direction, a traveling direction of image light passing through the incident side optical path 62 in the incident section 611 in the +X direction. The bending member 64 is provided on the inside of the bending section 612.

The bending member 64 bends, 90° in the −Z direction, the traveling direction of the image light having passed through the incident side optical path 62 in the +X direction. The bending member 64 is configured by, for example, a reflection mirror.

The emission section 613 is a part extending in the −Z direction from the bending section 612 and is a part configuring the emission side optical path 65 and housing the emission side lens group 66 on the inside. That is, the emission section 613 is a part corresponding to the emission side optical path 65 in the lens housing 61. In a part in the +Y direction in the emission section 613, as shown in FIG. 4, an opening section 614 through which the image light, the traveling direction of which is converted by the reflection element 67, passes is provided. The opening section 614 is closed by a translucent substrate TM such as glass.

A positional relation between the opening section 614 and the projection opening 212 and the end portion in the +Y direction in the light source device 4 is explained in detail below.

The projecting section 616 is provided in a part in the −Z direction with respect to the emission section 613. As shown in FIG. 4, the projecting section 616 is a part further projecting in the +X direction and the −X direction than the emission section 613 and houses the reflection element 67. That is, the external shape of the projecting section 616 is larger than the external shape of the emission section 613. The +X direction and the −X direction are directions in which the light source device 4 and the projection optical device 6 are disposed side by side.

As shown in FIG. 5, the emission side optical path 65 is an optical path provided on the inside of the emission section 613 and the inside of the projecting section 616 extending along the −Z direction, image light passing in the −Z direction from the bending member 64 and reaching the reflection element 67 on the optical path. That is, an optical axis of the emission side optical path 65 extends along the −Z direction. The emission side lens group 66 and the reflection element 67 are provided on the emission side optical path 65. That is, the projection optical device 6 includes the emission side lens group 66 disposed between the bending member 64 and the reflection element 67 on the emission side optical path 65.

The emission side lens group 66 is equivalent to an emission side refraction system lens group. In this embodiment, the emission side lens group 66 includes a focus lens 66A having the same function as the function of the focus lens 63A. The second operation member 84 explained below is operated by the user, whereby the focus lens 66A is moved along an optical path of the emission side lens group 66.

The reflection element 67 is disposed on an emission side of image light with respect to the emission side lens group 66 located in the emission section 613. That is, the reflection element 67 is disposed in a position where image light emitted from the emission side lens group 66 is made incident. The reflection element 67 is an aspherical mirror that reflects the image light made incident from the emission side lens group 66 in the +Y direction and the +Z direction and diffuses and projects the image light. The image light reflected by the reflection element 67 passes through the opening section 614 and the translucent substrate TM (see FIG. 4) and diffuses while traveling in the +Y direction as the image light travels in the +Z direction. Consequently, it is possible to display a large screen image on the projection surface even if the distance between the projector 1 and the projection surface is short. That is, the projector 1 is a short focus-type projector having a short focal length.

Detailed Configuration of the Projection Optical Device

Figure 7:
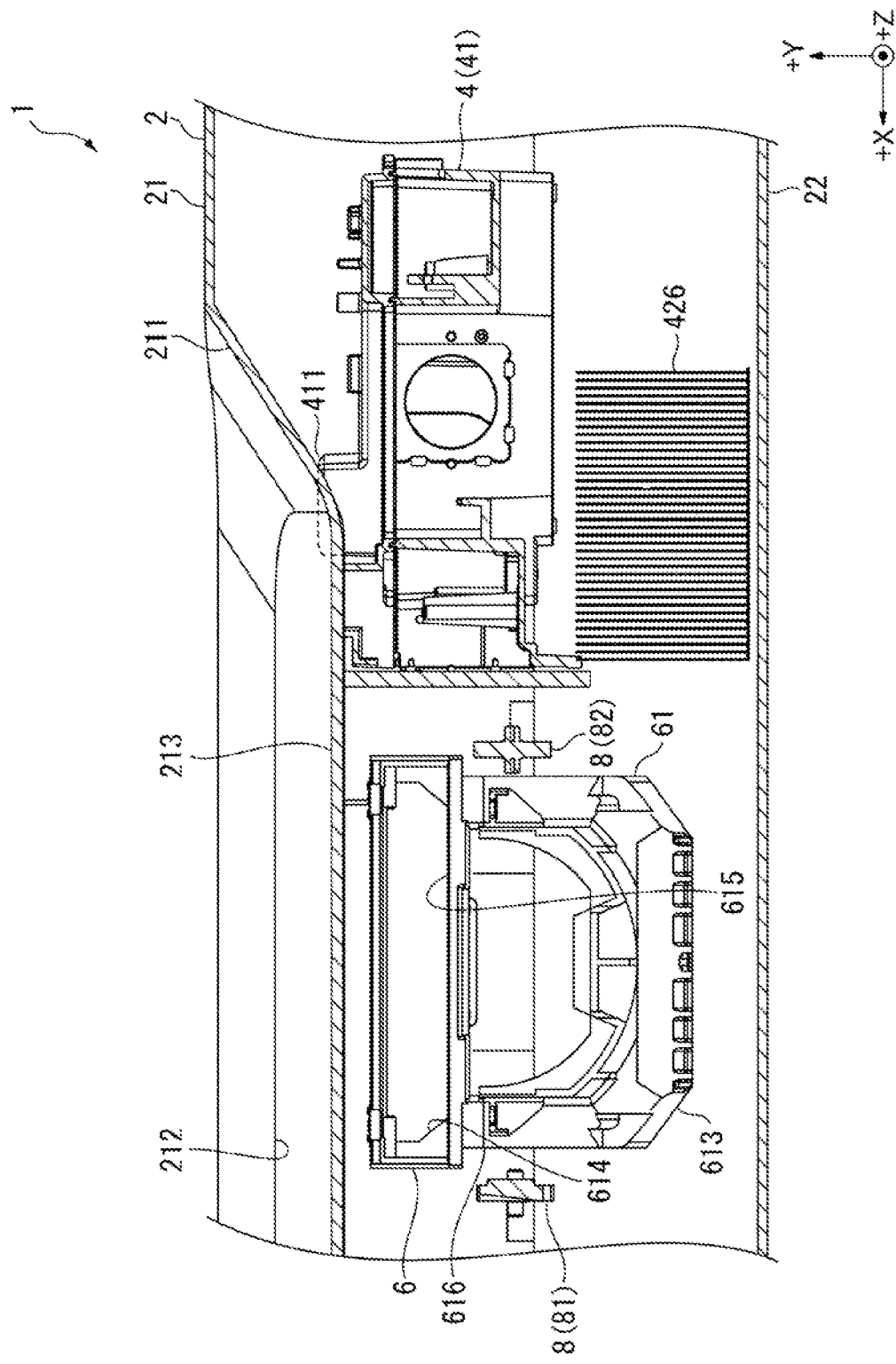
FIG. 7 is a diagram showing a positional relation between the light source device and an opening section in the embodiment.

FIG. 7 is a diagram showing a positional relation between the light source device 4 and the opening section 614 of the projection optical device 6. In other words, FIG. 7 is a diagram showing a cross section of the light source device 4 and the projection optical device 6 taken along an XY plane. In FIG. 7, illustration of the image generation device 5, the supporting member 7, and the like is omitted.

As shown in FIG. 7, the opening section 614 provided in the lens housing 61 (the projection optical device housing) of the projection optical device 6 forms a recess having an inclined surface expanding in an emitting direction. An end edge 615 in the −Y direction among end edges forming the opening section 614 is disposed further in the −Y direction than an end portion 411 in the +Y direction in the light source device 4. In other words, the end portion 411 in the +Y direction in the light source housing 41 of the light source device 4 is disposed further in the +Y direction than the end edge 615 in the −Y direction among the end edges forming the opening section 614. The end edge 615 in the −Y direction among the end edges forming the opening section 614 can be defined as an end edge on the reflection element 67 side of the opening section 614. Further, the projection opening 212 provided in the top surface 21 of the exterior housing 2 forms the recess 211 having the inclined surface expanding in the emitting direction from the opening section 614 of the projection optical device 6. The end portion 411 of the light source device 4 is disposed further in the +Y direction than an end edge 213 in the −Y direction among end edges of the projection opening 212 provided in the top surface 21 of the exterior housing 2. The end edge 213 in the −Y direction among the end edges of the projection opening 212 can be defined as an end edge on the opening section 614 side of the lens housing 61 (the projection optical device housing). The +Y direction is equivalent to a third direction from the bottom surface 22 functioning as the second surface toward the top surface 21 functioning as the first surface.

Therefore, it is likely that image light emitted from the opening section 614 and projected to the outside of the projector 1 via the projection opening 212 is blocked by the end portion 411 of the light source device 4.

Figure 8:
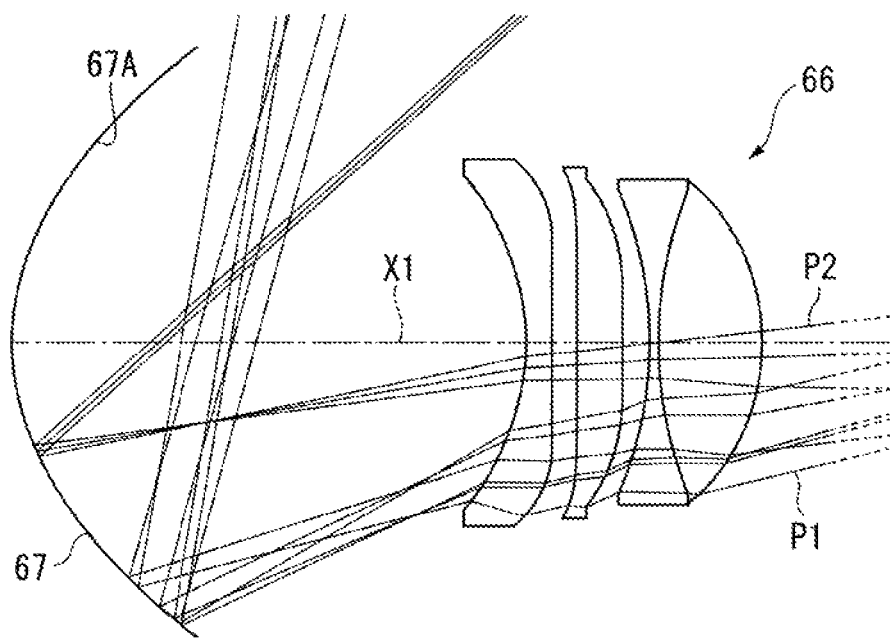
FIG. 8 is a ray diagram showing image light reflected by a reflection element in the embodiment.

FIG. 8 is a ray diagram showing image light reflected by the reflection element 67.

As shown in FIG. 8, image light made incident on a position apart in the −Y direction from an optical axis X1 of the reflection element 67 on a reflection surface 67A of the reflection element 67 is represented as image light P1 and image light made incident on a position close to the optical axis X1 of the reflection element 67 on the reflection surface 67A is represented as image light P2. A crossing angle of a traveling direction of the image light P1 reflected on the reflection surface 67A and the optical axis X1 is large. A crossing angle of a traveling direction of the image light P2 reflected on the reflection surface 67A and the optical axis X1 is small. Therefore, for example, as at the end portion 411 of the light source device 4, the image light P2 tends to be blocked by an object disposed further in the +Y direction than the opening section 614. The image light P2 is an example of image light made incident on an end edge on the exterior housing 2 side, that is, an end edge in the −Y direction in a projection range of the image light.

In contrast, in the projection optical device 6 according to this embodiment, the absolute value of "f2/f1" satisfies the following Expression 1 when a focal length of the projection optical device 6 that forms an image on the light modulation device 55 and projects image light is represented as f1 and a focal length of the reflection element 67 is represented as f2.

At this time, the focal length f2 of the reflection element 67 is preferably set to a focal length of a ray made incident on the end edge on the exterior housing 2 side in the projection range of the image light. That is, the focal length f2 is preferably set to a focal length of a ray made incident on the end edge in the −Y direction in the projection range of the image light.

The focal length of the projection optical device 6 is a focal length of the entire projection optical device 6 including the reflection element 67.

$$4.0 < |f2/f1| < 20.0 \tag{1}$$

Consequently, it is possible to shift the projection range of the image light by the projection optical device 6 in the +Y direction. Therefore, in the light source device 4, it is possible to suppress a part of the image light projected from the opening section 614 from being blocked by the end portion 411 disposed further in the +Y direction than the end edge 615 of the opening section 614 and the end edge 213 of the projection opening 212. In this way, even if the distance between the projection optical device 6 and the light source device 4 is small, it is possible to suppress a part of the projected image light from being blocked. Therefore, it is possible to reduce the distance between the projection optical device 6 and the light source device 4 disposed in the −X direction with respect to the projection optical device 6. Consequently, it is possible to reduce the dimension of the projector 1 in the +X direction.

On the other hand. Expression 1 described above is satisfied, whereby it is possible to suppress deterioration in image forming performance of the projection optical device 6. Consequently, it is possible to suppress deterioration of an image displayed by projecting the image light onto the projection surface. It is possible to secure visibility of the image by the user.

Therefore, it is possible to achieve a reduction in the size of the projector 1 while suppressing the blocking of a part of the image light and the deterioration in the image forming performance of the projection optical device 6.

The absolute value of "f2/f1" satisfies the following Expression 2, whereby it is possible to more suitably achieve the effects described above. That is, it is preferable that the following Expression 2 is satisfied.

$$7.0 < |f2/f1| < 15.0 \tag{2}$$

Further, in the projection optical device 6, as shown in FIG. 5, "L1/L2" is preferably satisfies the following Expression 3 when a lens length of the emission side lens group 66 is represented as L1 and a lens length of the incident side lens group 63 is represented as L2.

The lens length L1 of the emission side lens group 66 is a dimension along the optical axis of the emission side lens group 66 from a light incident surface in a lens provided nearest to an incident side of image light in the emission side lens group 66 to a light emission surface in a lens provided nearest to an emission side of the image light in the emission side lens group 66.

The lens length L2 of the incident side lens group 63 is a dimension along the optical axis of the incident side lens group 63 from a light incident surface in a lens provided nearest to an incident side of image light in the incident side lens group 63 to a light emission surface in a lens provided nearest to an emission side of the image light in the incident side lens group 63.

$$0.85L1/L2<1.5 \quad (3)$$

Expression 3 described above is satisfied, whereby it is possible to maintain a balance between refractive power of the emission side lens group 66 and refractive power of the incident side lens group 63. Consequently, it is possible to suppress an aberration due to, for example, increase in the difference between the refractive power of the emission side lens group 66 and the refractive power of the incident side lens group 63 from occurring. Therefore, it is possible to effectively suppress deterioration in the image forming performance of the projection optical device 6 and suppress deterioration of an image displayed on the projection surface.

In a state in which Expression 3 is satisfied, it is possible to reduce the dimension of the exterior housing 2 in the +X direction by setting the lens length L1 of the emission side lens group 66 larger than the lens length L2 of the incident side lens group 63. On the other hand, in the state in which Expression 3 is satisfied, it is possible to reduce the dimension of the exterior housing 2 in the +Z direction by setting the lens length L1 of the emission side lens group 66 smaller than the lens length L2 of the incident side lens group 63. Therefore, it is possible to achieve a reduction in the size of the projector 1.

An example concerning the above is explained in detail below.

Configuration of the Supporting Member

As shown in FIG. 4, the supporting member 7 is a substrate provided on the inside of the exterior housing 2 and supporting the light source device 4, the image generation device 5, and the projection optical device 6. The supporting member 7 has an area enough for including the entire image projection device 3 including the light source device 4, the image generation device 5, and the projection optical device 6 when viewed from the +Y direction. With such a supporting member 7, it is possible to suppress deviation of the load of the image projection device 3 and stably support the image projection device 3.

Configuration of the Position Adjustment Device

The position adjustment device 8 adjusts the position of the focus lens 63A configuring the incident side lens group 63 and the position of the focus lens 66A configuring the emission side lens group 66. The position adjustment device 8 includes, as shown in FIG. 4, a first moving frame body 81, a second moving frame body 82, a first operation member 83, and a second operation member 84.

Configurations of the First Moving Frame Body and the Second Moving Frame Body

The first moving frame body 81 supports the focus lens 63A and provided in the incident section 611 of the lens housing 61. The first moving frame body 81 is turned centering on a turning axis parallel to the optical axis of the incident side lens group 63 to thereby move the focus lens 63A in a ±X direction along the optical axis of the incident side lens group 63.

The second moving frame body 32 supports the focus lens 66A and is provided in the emission section 613 of the lens housing 61. The second moving frame body 82 is turned centering on a turning axis parallel to the optical axis of the emission side lens group 66 to thereby move the focus lens 66A in a ±Z direction along the optical axis of the emission side lens group 66.

Configuration of the First Operation Member

The first operation member 83 is equivalent to a lever member. The first operation member 83 moves the focus lens 63A along the optical axis of the incident side lens group 63. The first operation member 83 is disposed between the light source device 4 and the projection optical device 6 in the +X direction and extends along the +Z direction. The first operation member 83 includes a shaft section 831, an operation section 832, and an engaging section 833.

The shaft section 831 is provided in substantially the center in the +Z direction in the first operation member 83. The shaft section 831 is formed in a columnar shape projecting in the +X direction and forms a turning axis extending along the +X direction of the first operation member 83. The shaft section 831 may be supported by the lens housing 61 or may be supported by the supporting member 7.

The operation section 832 is provided in the −Z direction in the first operation member 83 and is exposed via the opening section for operation 236. The operation section 832 is moved in a ±Y direction, whereby the first operation member 83 is turned centering on the shaft section 831 and moves the engaging section 833 in the ±Y direction.

The engaging section 833 is engaged with the first moving frame body 81 and moves the first moving frame body 81 along the optical axis of the incident side lens group 63. Specifically/when the operation section 532 is operated in the −Y direction and the engaging section 833 is moved in the +Y direction, the focus lens 63A is moved in one of the +X direction and the −X direction along the optical axis of the incident side lens group 63 together with the first moving frame body 81. When the operation section 832 is operated in the +Y direction and the engaging section 833 is moved in the −Y direction, the focus lens 63A is moved in the other of the +X direction and the −X direction along the optical axis of the incident side lens group 63 together with the first moving frame body 81.

The focus lens 63A functioning as the optical adjustment lens is moved as explained above, whereby a focus state of an image displayed on the projection surface is adjusted.

Configuration of the Second Operation Member

The second operation member 84 moves the focus lens 66A in the ±Z direction along the optical axis of the emission side lens group 66. The second operation member 84 is disposed between the projection optical device 6 and the control device CD and the power supply device PS in the +X direction and extends along the +Z direction. The second operation member 84 includes a shaft section 841, an operation section 842, and an engaging section 843 same as the shaft section 831, the operation section 332, and the engaging section 333 of the first operation member 83. The second operation member 84 acts in the same manner as the first operation member 83, moves the second moving frame body 82, and moves the focus lens 66A along the optical axis of the emission side lens group 66. Consequently, a focus state of an image displayed on the projection surface is adjusted.

Effects of the Embodiment

The projector 1 according to this embodiment explained above achieves effects described below.

The projector 1 includes the exterior housing 2, the light source device 4, the image generation device 5, and the projection optical device 6. The exterior housing 2 houses the light source device A, the image generation device 5, and the projection optical device 6. The light source device A emit a light in the +Z direction. The +Z direction is equivalent to the first direction. The image generation device 5 includes the light modulation device 55 that modulates incident light. The image generation device 5 modulates light made incident in the +Z direction from the light source device 4 to generate image light and emits the image light in the +X direction crossing the direction. The +X direction is equivalent to the second direction.

The projection optical device 6 projects image light made incident along the +X direction from the image generation device 5. The projection optical device 6 includes the incident side optical path 62, the bending member 64, the emission side optical path 65, and the reflection element 67. The image light is made incident on the incident side optical path 62 from the image generation device 5 along the +X direction. The bending member 64 bends, in the −Z direction, the image light having passed through the incident side optical path 62. The −Z direction is the opposite direction of the first direction. The emission side optical path 65 is disposed side by side with the light source device 4 in the +X direction. The image light bent by the bending member 64 is made incident on the emission side optical path 65 along the −Z direction. The reflection element 67 is provided on the emission side optical path 65, reflects the incident image light, and projects the image light to the outside of the exterior housing 2.

The absolute value of "f2/f1" satisfies Expression 1 described above when the focal length of the projection optical device 6 that projects image light is represented as f1 and the focal length of the reflection element 67 is represented as f2.

With such a configuration, it is possible to separate the projection range of the image light by the projection optical device 6 from the exterior housing 2 while suppressing deterioration in the image forming performance of the projection optical device 6. For example, in the first projection posture described above, the absolute value of "f2/f1" satisfies Expression 1 described above, whereby it is possible to shift the projection range of the image light to the upper side while suppressing deterioration in the image forming performance of the projection optical device 6. Therefore, it is possible to suppress the image light from being blocked by the devices and the members configuring the projector 1. Consequently, it is unnecessary to greatly separate the light source device 4 from the projection optical, device 6 not to block the image light. Therefore, it is possible to suppress the blocking of the image light and the deterioration in the image forming performance of the projection optical device 6. Besides, it is possible to reduce the dimension of the projector 1 in the +X direction.

In the projector 1, the focal length f1 of the reflection element 67 is a focal length of a ray made incident on the end edge on the exterior housing 2 side in the projection range of the image light. Specifically, in the first projection posture, the focal length f1 of the reflection element 67 is a focal length of a ray made incident on the end edge in the −Y direction in the projection range of the image light.

With such a configuration, it is possible to suppress the images light P2 made incident on the end edge in the −Y direction in the projection range of the image light from being blocked by the end portion 411 of the light source device 4.

In the projector 1, the exterior housing 2 includes the top surface 21, the bottom surface 22, and the projection opening 212. The top surface 21 is disposed in the reflecting direction of the image light by the reflection element 67. The top surface 21 is equivalent to the first surface. The bottom surface 22 is disposed on the opposite side of the top surface 21. The bottom surface 22 is equivalent to the second surface. The projection opening 212 is provided in the top surface 21. The image light projected by the projection optical device 6 passes through the projection opening 212. The +Y direction is the direction from the bottom surface 22 toward the top surface 21 and is equivalent to the third direction. In the light source device 4, the end portion 411 in the +Y direction is disposed further in the +Y direction than the portion in the −Y direction among the end edges of the projection opening 212.

In a normal projector, if a part of a light source device is disposed further in the +Y direction than a portion in the −Y direction in a projection opening, a part of image light projected from the projection opening tends to be blocked by the part of the light source device.

In contrast, Expression 1 described above is satisfied, whereby it is possible to suppress a part of the image light projected from the projection opening 212 from being blocked by the end portion 411 of the light source device 4. Therefore, it is possible to make it easy to achieve a reduction in the size of the projector 1. Besides, it is possible to improve a degree of layout freedom of the light source device 4 in the exterior housing 2.

In the projector 1, the absolute value of "f2/f1" satisfies Expression 2 described above.

With such a configuration, it is possible to effectively shift the projection range of the image light while suppressing deterioration in the image forming performance of the projection optical device 6. Therefore, it is possible to suitably achieve the effects described above.

In the projector 1, the projection optical device 6 includes the incident side lens group 63 and the emission side lens group 66. The incident side lens group 63 is a lens group disposed on the incident side optical path 62 and is equivalent to the incident side refraction system lens group. The emission side lens group 66 is a lens group disposed between the bending member 64 and the reflection element 67 on the emission side optical path 65 and is equivalent to the emission side refraction system lens group. "L1/L2" satisfies Expression 3 described above when the lens length of the emission side lens group 66 is represented as L1 and the lens length of the incident side lens group 63 is represented as L2.

With such & configuration, it is possible to maintain the balance between the refractive power of the emission side lens group 66 and the refractive power of the incident aide lens group 63 and suppress occurrence of an aberration. In a state in which Expression 3 described above is satisfied, it is possible to reduce the dimension of the exterior housing 2 in the +X direction by setting the lens length L1 of the emission side lens group 66 larger than the lens length L2 of the incident side lens group 63. On the other hand, in a state in which Expression 2 described above is satisfied, it is possible to reduce the dimension of the exterior housing 2 in the +Z direction by setting the lens length L1 of the emission side lens group 66 smaller than the lens length L2 of the incident, side lens group 63. Therefore, it is possible to achieve a reduction in the size of the projector 1.

The projector 1 includes the first operation member 83 disposed between the light source device 4 and the projection optical device 6 in the +X direction and extending along the +Z direction. The first operation member 83 is equivalent to the lever member. The incident side lens group 63 includes the focus lens 63A that moves along the optical axis of the incident side lens group 63. The focus lens 63A is equivalent to the optical adjustment lens. The first operation member 83 moves the focus lens 63A along the optical axis of the incident side lens group 63.

With such a configuration, the first operation member 83 that moves the focus lens 63A can be disposed using a space between the light source device 4 and the projection optical device 6. Therefore, compared with when the first operation member 83 is disposed in another place, it is possible to effectively use the space in the exterior housing 2 and achieve a reduction in the size of the projector 1.

The projector 1 includes one supporting member 7 disposed in the exterior housing 2 and supporting the light source device 4, the image generation device 5, and the projection optical device 6.

Since the reflection element 67 is a relatively large member in the projection optical device 8, the center of gravity of the projection optical device 6 tends to deviate to the reflection element 67 side in the projection optical device 6.

In contrast, the one supporting member 7 supports not only the projection optical device 6 but also the light source device 4 and the image generation device 5, whereby it is possible to suppress deviation of a load acting on the exterior housing 2. Consequently, it is possible to stably support the light source device 4, the image generation device 5, and the projection optical device 6.

Besides, it is possible to make it easy to dispose the light source device 4, the image generation device 5, and the projection optical device 6 in positions in design. Therefore, it is possible to simplify an assembly process for the projector 1.

Modifications of the Embodiment

The present disclosure is not limited to the embodiment. Modifications, improvements, and the like in a range in which the object of the present disclosure can be achieved are included in the present disclosure.

In the embodiment, the focal length f2 of the reflection element 67 is the focal length of the ray made incident on the end edge on the exterior housing 2 side in the projection range of the image light projected by the projection optical device 6. For example, the focal length f2 of the reflecting device 67 is the focal length of the ray made incident on the end edge in the −Y direction in the projection range of the image light projected by the projection optical device 6. However, not only this, but, for example, the focal length f2 of the reflection element 67 may be a focal length of a ray made incident on the center in the projection range of the image light. That is, the focal length f2 of the reflection element 67 may fee a focal length of a ray made incident on any position in the projection range of the image light.

In the embodiment, the projection opening 212 is provided in the bottom of the recess 211 provided in the top surface 21 functioning as the first surface. However, not only this, but the recess 211 may be absent if the projection opening 212 is provided.

The projection opening 212 is provided in the top surface 21 on the opposite side of the bottom surface 22. However, a surface in which the projection opening 212 is provided in the exterior housing 2 may be a surface other than the top surface 21.

In the light source device 4, the end portion 411 in the +Y direction is disposed further in the +Y direction than the end edge 213 in the −Y direction among the end edges of the projection opening 212. However, not only this, but the end portion 411 may be disposed further in the −Y direction than the end edge 213. Similarly, the end portion 411 is disposed further in the +Y direction than the end edge 615 in the −Y direction among the end edges of the opening section 614. However, not only this, but the end portion 411 may be disposed further in the −Y direction than the end edge 615.

Further, a member, an end portion of which is located further in the +Y direction than the end edge 213 of the projection opening 212, is not limited to the light source device 4 and may be another member. A member provided further in the +Y direction than the end edge 213 may be absent on the inside of the exterior housing 2.

In the embodiment, the projection optical device 6 includes the incident side lens group 63 and the emission side lens group 66. However, not only this, but one lens group of the incident side lens group 63 and the emission side lens group 66 may be absent. The number of lenses configuring the incident side lens group 63 and the number of lenses configuring the emission side lens group 66 can be set as appropriate.

In the embodiment, the ratio of the lens length L1 of the emission side lens group 66 to the lens length L2 of the incident side lens group 63, that is, "L1/L2" satisfies Expression 3 described above. However, not only this, but Expression 3 described above may not be satisfied.

In the embodiment, the projector 1 includes the first operation member 83 functioning as the lever member. The first operation member 83 moves the focus lens 63A included in the incident side lens group 63 along the optical axis of the incident side lens group 63. However, not only this, but the first, operation member 83 may be absent. For example, the position adjustment device 8 may be absent. Like the second operation member 84, the first operation member 83 may be disposed in the +X direction with respect to the projection optical device 6. On the other hand, the second operation member 84 may be provided between the light source device 4 and the projection optical device 6 together with the first operation member 83.

In the embodiment, the first operation member 83 moves the focus lens 63A included in the incident side lens group 63 along the optical axis of the incident side lens group 63. However, not only this, but a lens moved by the first operation member 83 may be the focus lens 66A included in the emission side lens group 66. That is, the first operation member 83 may engage with the second moving frame body 82.

An optical adjustment lens moved by the lever member according to the present disclosure is not limited to a focus lens and may be another optical lens such as a zoom lens.

In the embodiment, the projector 1 includes the one supporting member 7 disposed in the exterior housing 2 and supporting the light source device 4, the image generation device 5, and the projection optical device 6. However, the supporting member 7 may be absent. The shape of the supporting member 7 may not be a substrate shape if the supporting member 7 can support the light source device 4, the image generation device 5, and the projection optical device 6.

In the embodiment, the light modulation device 55 includes the three light modulation elements 55B, 55G, and 55R. However, not only this, but the number of light modulation elements included in a light modulation device is not limited to three and can be changed as appropriate.

Each of the light modulation elements 55B, 55G, and 55R includes the transmissive liquid crystal panel, the light incident surface and the light emission surface of which are different. However, not only this, but the light modulation element may include a reflective liquid crystal panel, a light incident surface and a light emission surface of which are the same. A light modulation device other than liquid crystal such as a light modulation device that makes use of a device including a micromirror, for example, a DMD (Digital Micromirror Device) may be used if the light modulation device is capable of modulating an incident light beam and forming an image corresponding to image information.

EXAMPLE

An example carried out by the inventor is explained below.

A range of a ratio of a focal length of a reflection element to a focal length of a projection optical device The inventor examined a layout in an exterior housing in reducing a projector in size. At this time, the inventor examined to juxtapose a light source device and a projection optical device in the +X direction, which was an emitting direction of image light from an image generation device.

However, when the light source device and the projection optical device were juxtaposed in the +X direction, it was considered likely that the end portion in the +Y direction in the light source device blocked a part of image light projected from an opening section provided in a lens housing of the projection optical device.

On the other hand, it was conceived that, if refraction by a reflection element was increased and a projection range of the image light from the reflection element, that is, a projection range of the image light by the projection optical device was shifted in the direction, image forming performance of the projection optical device was deteriorated.

Consequently, the inventor found, as a result of the earnest study, a ratio of the focal length f2 of the reflection element 67 to the focal length f1 of the entire projection optical device 6 that formed an image on the light modulation device 55 and projected image light, that is, the absolute value of "f2/f1" satisfied Expression 1 described above, whereby the blocking of the image light and the deterioration in the image forming performance of the projection optical device were able to be suppressed.

Figure 9:
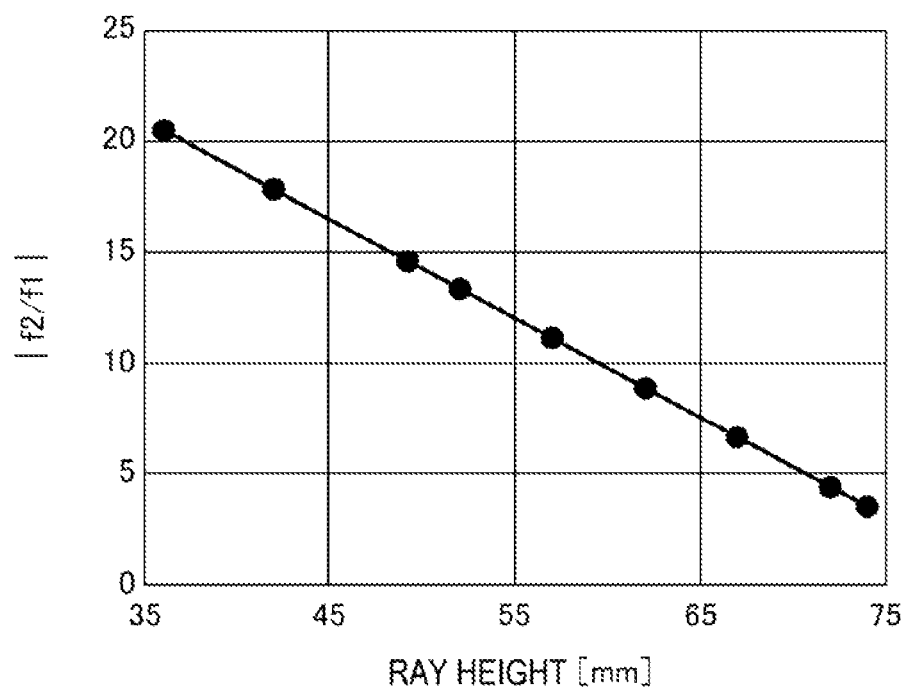
FIG. 9 is a graph showing a relation between a ratio of a focal length of the reflection element to a focal length of a projection optical device and a ray height in an example.

FIG. 9 is a graph showing a relation between the absolute value of "f2/f1" and a ray height.

First, the inventor verified how the ray height changed according to the absolute value of "f2/f1". About calculation of the ray height, using, as samples, projection optical devices including the same configuration as the configuration of the projection optical device 6, absolute values of "f2/f1" of the projection optical devices being 3.9, 7.0, 8.8, 11.2, 13.5, 14.5, and 20.1, ray heights of the projection optical devices were calculated. The ray height is height between a center position of projected light from the projection optical device and the projection optical device on a projection surface separated from the projection optical device by a predetermined distance. A unit of the ray height is mm.

It was found that, as shown in FIG. 9, the ray height decreased as the absolute value of "f2/f1" increased and the ray height increased as the absolute value of "f2/f1" decreased. For example, when the absolute value of "f2/f1" was 3.9, the ray height was approximately 74 mm, when the absolute value of "f2/f1" was 11.2, the ray height was approximately 57 mm, and, when the absolute value of "f2/f2" was 20.1, the ray height was approximately 36 mm. Therefore, it was found that the absolute value of "f2/f1" needed to be set as small as possible in order to increase the ray height and prevent projected light such as image light from being blocked.

Subsequently, the inventor verified how the image forming performance of the projection optical device changed according to the absolute value of "f2/f1". The image forming performance of the projection optical device was evaluated by measuring an MTF (Modulation Transfer Function). Like the samples of the ray heights, evaluation targets of the image forming performance are the projection optical devices, absolute values of "f2/f1" of which are 3.9, 7.0, 8.6, 11.2, 13.5, 14.5, and 20.1. In this verification, it was determined that the image forming performance of the projection optical device was sufficient if the MTF was equal to or larger than a predetermined value and the image forming performance of the projection optical device was insufficient if the MTF was smaller than the predetermined value.

About measurement of the MTF, a known measurement, method can be adopted. In this example, a chart image was projected for each of the projection optical devices having the different absolute values of "f2/f1" and the MTF was measured based on a captured image obtained by capturing the projected chart image with a camera.

An evaluation result of the image forming performance of the projection optical devices based on measured MTFs is shown in Table 1 below.

In an "image forming performance" field of Table 1, "A" indicates that the MTF of the projection optical device greatly exceeds the predetermined value and the image forming performance of the projection optical device is sufficiently satisfactory, "B" indicates that the MTF is equal to or larger than the predetermined value and the image forming performance of the projection optical device is satisfactory, and "C" indicates that the MTF is equal to or larger than the predetermined value and a standard of the projection optical device is satisfied hut the image forming performance of the projection optical device is lower compared with the cases of "A" and "B".

In a "ray height" field of Table 1, "A" indicates that the calculated ray height is sufficiently high with respect to a reference value, "B" indicates that the calculated ray height is higher than the reference value, and "C" indicates that the calculated ray height is slightly higher than the reference value but is lower compared with the cases of "A" and "B".

TABLE 1

| |f2/f1| | Ray height | Image forming performance | |f1| | |f2| |
|---|---|---|---|---|
| 3.9 | A | C | 2.07 | 8.073 |
| 7.0 | A | C | 2.07 | 14.49 |
| 8.8 | A | B | 2.19 | 19.3 |

TABLE 1-continued

| \|f2/f1\| | Ray height | Image forming performance | \|f1\| | \|f2\| |
|---|---|---|---|---|
| 11.2 | A | A | 2.14 | 23.9 |
| 13.5 | B | A | 2.09 | 28.2 |
| 14.5 | B | A | 2.07 | 30.0 |
| 20.1 | C | C | 2.07 | 41.6 |

According to such a verification, as shown in Table 1, it was found that there was a range of the absolute value of "f2/f1" in which the image forming performance was sufficient. For example, if the absolute value of "f2/f1" was 11.2 or more and 14.5 or less, the image forming performance of the projection optical device was sufficiently satisfactory. If the absolute value of "f2/f1" was 8.8 or more and less than 11.2, the image forming performance of the projection optical device was satisfactory. Further, if the absolute value of "f2/f1" was 3.9 or more and 7.0 or less and if the absolute value of "f2/f1" was 20.1 or more, the standard of the projection optical device was satisfied but the image forming performance of the projection optical device was low.

From the above, it was found that, Expression 1 described above indicating that the absolute value of "f2/f1" is more than 4.0 and less than 20.0 is satisfied, whereby it is possible to configure the projection optical device that can suppress the blocking of the image light and the deterioration in the image forming performance when being applied to the projector 1.

By applying such a projection optical device to the projector 1, it is unnecessary to greatly separate, from the projection optical device, the light source device disposed in the −X direction with respect to the emission side optical path of the projection optical device not to block the image light. Therefore, it was found that it is possible to suppress the blocking of the image light and the deterioration in the image forming performance of the projection optical device and reduce the dimension of the projector in the +X direction.

Further, it was found that, Expression 2 described above indicating that the absolute value of "f2/f1" is more than 7.0 and less than 15.0 is satisfied, whereby it is possible to effectively suppress the blocking of the image light and the deterioration in the image forming performance of the projection optical device and achieve a reduction in the size of the projector.

A range of a ratio of a lens length of an emission side lens group to a lens length of an incident side lens group Subsequently, the inventor verified how the image forming performance of the projection optical device changed according to a ratio of the lens length L1 of an emission side lens group to the lens length L2 of an incident side lens group, that is, "L1/L2". Evaluation targets of the image forming performance were projection optical devices, the absolute value of "f2/f1" which satisfied Expression 1 described above and "L1/L2" of which was 0.84, 1.00, 1.20, 1.35, and 1.52. The image forming performance of the projection optical devices was evaluated by measuring an MTF. A unit of L1 and a unit of L2 are mm.

An evaluation result of the image forming performance of the projection optical devices based on measured MTFs is shown in Table 2 below.

In an "image forming performance" field of Table 2, "A" and "B" are the same as those described above.

In a "length" field of Table 2, "A" indicates that the length of the entire projection optical device is small and a reduction in the size of the projection optical device is achieved and "B" indicates that the length of the entire projection optical device is large with respect to "A".

The entire length is the length from a light incident surface of a lens disposed nearest to a light incident side in the incident side lens group to a light emission surface of a lens disposed nearest to a light emission side in the emission side lens group in an optical path of a light beam passing through the projection optical device. A unit of the entire length is mm.

TABLE 2

| L1/L2 | Image forming performance | Length | L1 | L2 | L1 + L2 | Entire length |
|---|---|---|---|---|---|---|
| 0.84 | B | B | 56.0 | 66.7 | 122.7 | 215.2 |
| 1.00 | A | A | 60.0 | 60.0 | 120.0 | 210.8 |
| 1.20 | A | A | 63.3 | 52.7 | 116.0 | 210.0 |
| 1.35 | A | A | 68.6 | 50.9 | 119.5 | 210.3 |
| 1.52 | A | B | 74.5 | 49.0 | 123.5 | 212.9 |

According to such a verification, as shown in Table 2, it was found that there was a range of "L1/L2" in which the image forming performance was satisfactory and a reduction in the size of the projection optical device was achieved. For example, it was found that, in a range in which "L1/L2" was approximately 1.00 or more and approximately 1.35 or less, the image forming performance of the projection optical device was sufficiently satisfactory and the entire length of the projection optical device was able to be reduced. If "L1/L2" was 0.84 or less, the image forming performance of the projection optical device was satisfactory hut the entire length of the projection optical device did not decrease much. If "L1/L2" was 1.52 or more, the image forming performance of the projection optical device was sufficiently satisfactory but the entire length of the projection optical device did not decrease much.

From the above, it was found that, Expression 3 described above indicating that "L1/L2" is more than 0.85 and less than 1.5 is satisfied, whereby it is possible to configure the projection optical device, the image forming performance of which is satisfactory and a reduction in the size of which can be achieve when being applied to the projector 1.

Overview of the Present Disclosure

An overview of the present disclosure is added below.

A projector according to an aspect of the present disclosure includes: a light source device configured to emit light in a first direction; an image generation device including a light modulation device configured to modulate incident light, the image generation device modulating light made incident in the first direction from the light source device to generate image light and emitting the image light in a second direction crossing the first direction; a projection optical device configured to project the image light made incident along the second direction from the image generation device; and an exterior housing housing the light source device, the image generation device, and the projection optical device. The projection optical device includes: an incident side optical path on which the image light is made incident along the second direction from the image generation device; a bending member configured to bend, in an opposite direction of the first direction, the image light having passed through the incident side optical path; an emission side optical path on which the image light bent by the bending member is made incident along the opposite direction of the first direction, the emission side optical path being disposed side by side with the light device in the second direction; and a reflection element provided on the emission side optical path and configured to reflect the image light made incident thereon and project the image light to an outside of the exterior housing. An absolute value of f2/f1 satisfies 4.0<|f2/f1|<20.0, where f1 represents a focal length of the projection optical device that forms an image on the light modulation device and projects the image light and f2 represents a focal length of the reflection element.

A posture of the projector placed on the setting surface at the time when the projector projects the image light to the rear surface side and upward from the top surface disposed on the upper side in the exterior housing as explained above is referred to as first projection posture. The focal length of the projection optical device is a focal length of the entire projection optical device including the reflection element.

According to the configuration explained above, the ratio of the focal length f2 of the reflection element to the focal length f1 of the projection optical device, that is, the absolute value of "f2/f1" satisfies the conditional expression described above, whereby it is possible to separate a projection range of image light by the projection optical device from the exterior housing while suppressing deterioration in image forming performance of the projection optical device. For example, in the first projection posture, the absolute value of "f2/f1" satisfies the conditional expression described above, whereby it is possible to shift the projection range of the image light to the upper side while suppressing deterioration in the image forming performance of the projection optical device. Therefore, it is possible to suppress the image light from being blocked by the devices and the members configuring the projector. Consequently, it is unnecessary to greatly separate the light source device set in the opposite direction of the second direction with respect to the emission side optical path of the projection optical device from the projection optical device not to block the image light. Therefore, it is possible to suppress the blocking of the image light and the deterioration in the image forming performance of the projection optical device. Besides, it is possible to reduce the dimension of the projector in the second direction.

In the aspect, the focal length of the reflection element may be a focal length of a ray made incident on an end edge on the exterior housing side in a projection range of the image light.

Specifically, in the first projection posture, the ray made incident on the end edge on the exterior housing side in the projection range of the image light is a ray made incident on the end edge on the lower side in the projection range of the image light.

According to the configuration, it is possible to suppress the ray made incident on the end edge on the exterior housing side in the projection range of the image light from being blocked by, for example, the light source device.

In the aspect, the exterior housing may include: a first surface disposed in a reflecting direction of the image light by the reflection element; a second surface disposed on an opposite side of the first surface; and a projection opening provided in the first surface, the image light projected by the projection optical device passing through the projection opening. When a direction from the second surface toward the first surface is represented as a third direction, in the light source device, an end portion in the third direction may be disposed further in the third direction than an end edge in an opposite direction of the third direction among end edges of the projection opening.

In a normal projector, when a part of a light source device is disposed further in the third direction than a portion in the opposite direction of the third direction in a projection opening, a part of image light projected from the projection opening tends to be blocked by a part of the light source device.

In contrast, the absolute value of "f2/f1" satisfies the conditional expression described above, whereby it is possible to suppress a part of the image light projected from the projection opening from being blocked by a part of the light source device. For example, in the first projection posture, since the third direction is the upward direction, even if the end portion on the upper side in the light source device is disposed further in the upward direction than a portion in the downward direction among the end edges of the projection opening, it is possible to suppress a part of the image light from being blocked by the end portion on the upper side in the light source device. Therefore, it is possible to make it easy to achieve a reduction in the size of the projector. Besides, it is possible to improve a degree of layout freedom of the light source device in the exterior housing.

In the aspect, the absolute value of "f2/f1" may satisfy 7.0<|f2/f1|<15.0.

With such a configuration, it is possible to effectively shift the projection range of the image light while suppressing deterioration in the image forming performance of the projection optical device. Therefore, it is possible to suitably achieve the effects described above.

In the aspect, the projection optical device may include: an emission side refraction system lens group disposed between the bending member and the reflection element on the emission side optical path; and an incident side refraction system lens group disposed on the incident side optical path, and L1/L2 may satisfy 0.85<L1/L2<1.5, where L1 represents a lens length of the emission side refraction system lens group and L2 represents a lens length of the incident side refraction system lens group.

The lens length L1 of the emission side refraction system lens group is a dimension along an optical axis of the emission side refraction system lens group from a light incident surface of a lens disposed nearest to a light incident side to a light emission surface of a lens disposed nearest to a light, emission side in the emission side refraction system lens group. The lens length L2 of the incident side refraction system lens group is a dimension along an optical axis of the incident side refraction system lens group from a light incident surface of a lens disposed nearest to a light incident side to a light emission surface of a lens disposed nearest to a light emission side in the incident side refraction system lens group.

The conditional expression about L1/L2 is satisfied, whereby it is possible to maintain a balance between refractive power of the emission side refraction system lens group and refractive power of the incident side refraction system lens group and suppress occurrence of an aberration. In a state in which the conditional expression described above about L1/L2 is satisfied, by setting the lens length L1 of the emission side refraction system lens group larger than the lens length L2 of the incident side refraction system lens group, it is possible to reduce the dimension of the exterior housing in the second direction. On the other hand, in a state in which the conditional expression described above about L1/L2 is satisfied, by setting the lens length L1 of the emission side refraction system lens group smaller than the lens length L2 of the incident side refraction system lens group, it is possible to reduce the dimension of the exterior housing in the first direction. Therefore, it is possible to achieve a reduction in the size of the projector.

In the aspect, the projector may further include a lever member disposed between the light source device and the projection optical device in the second direction and extending along the first direction, one refraction system lens group of the emission side refraction system lens group and the incident side refraction system lens group may include an optical adjustment lens that moves along an optical axis of the one refraction system lens group, and the lever member may move the optical adjustment lens along the optical axis of the one refraction system lens group.

With such a configuration, the lever member that moves the optical adjustment lens can be disposed using a space between the light source device and the projection optical device. Therefore, compared with when the lever member is disposed in another place, it is possible to effectively use the space in the exterior housing and achieve a reduction in the size of the projector.

In the aspect, the projector may further include one supporting member disposed in the exterior housing and supporting the light source device, the image generation device, and the projection optical device.

Since the reflection element is a relatively large member in the projection optical device, the center of gravity of the projection optical device tends to deviate to the reflection element side in the projection optical device.

In contrast, one supporting member supports not only the projection optical device but also the light source device and the image generation device, whereby it is possible to suppress deviation of a load acting on the exterior housing. Consequently, it is possible to stably support the light source device, the image generation device, and the projection optical device.

Besides, it is possible to make it easy to dispose the light source device, the image generation device, and the projection optical device in positions in design. Therefore, it is possible to simplify an assembly process for the projector.

What is claimed is:

1. A projector comprising:
  a light source device configured to emit light in a first direction;
  an image generation device including a light modulation device configured to modulate incident light, the image generation device modulating light made incident from the light source device to generate image light and emitting the image light;
  a projection optical device configured to project the image light made incident along a second direction from the image generation device; and
  an exterior housing housing the light source device, the image generation device, and the projection optical device, wherein
  the projection optical device includes:
    an incident side optical path on which the image light is made incident from the image generation device;
    a bending member configured to bend the image light having passed through the incident side optical path;
    an emission side optical path on which the image light bent by the bending member is made incident;
    a reflection element provided on the emission side optical path and configured to reflect the image light made incident thereon and project the image light to an outside of the exterior housing;
    an emission side refraction system lens group disposed between the bending member and the reflection element on the emission side optical path;
    an incident side refraction system lens group disposed on the incident side optical path; and
    a position adjustment device that adjusts a position of a first focus lens on the incident side optical path and a position of a second focus lens on the emission side optical path, the position adjustment device including a first moving frame body that supports the first focus lens and turns centering on a first turning axis and a second moving frame body that supports the second focus lens and turns centering on a second turning axis,
  an absolute value of f2/f1 satisfies $4.0<|f2/f1|<20.0$, where f1 represents a focal length of the projection optical device that forms an image on the light modulation device and projects the image light and f2 represents a focal length of the reflection element, and
  L1/L2 satisfies $1.00<L1/L2<1.35$, where L1 represents a lens length of the emission side refraction system lens group and L2 represents a lens length of the incident side refraction system lens group.

2. The projector according to claim 1, wherein the focal length of the reflection element is a focal length of a ray made incident on an end edge on the exterior housing side in a projection range of the image light.

3. The projector according to claim 1, wherein
  the exterior housing include:
  a first surface disposed in a reflecting direction of the image light by the reflection element;
  a second surface disposed on an opposite side of the first surface; and
  a projection opening provided in the first surface, the image light projected by the projection optical device passing through the projection opening, and
  when a direction from the second surface toward the first surface is represented as a third direction, in the light source device, an end portion in the third direction is disposed further in the third direction than an end edge in an opposite direction of the third direction among end edges of the projection opening.

4. The projector according to claim 1, wherein the absolute value of f2/f1 satisfies $7.0<|f2/f1|<15.0$.

5. The projector according to claim 1, further comprising a lever member disposed between the light source device and the projection optical device in the second direction and extending along the first direction, wherein
  one refraction system lens group of the emission side refraction system lens group and the incident side refraction system lens group includes an optical adjustment lens that moves along an optical axis of the one refraction system lens group, and
  the lever member moves the optical adjustment lens along the optical axis of the one refraction system lens group.

6. The projector according to claim 1, wherein the projector further includes one supporting member disposed in the exterior housing and supporting the light source device, the image generation device, and the projection optical device.

7. The projector according to claim 1, wherein
  the image generation device modulates light made incident in the first direction from the light source device to generate image light and emitting the image light in the second direction, the second direction crossing the first direction, the incident side optical path on which the image light is made incident along the second direction from the image generation device, the bending member configured to bend, in an opposite direction of the first direction, the image light having passed through the incident side optical path, and the emission side optical path on which the image light bent by the bending member is made incident along the opposite direction of the first direction, the emission side optical path being disposed side by side with the light source device in the second direction.

8. A projector comprising:

a light source device configured to emit light in a first direction;

an image generation device including a light modulation device configured to modulate incident light, the image generation device modulating light made incident from the light source device to generate image light and emitting the image light;

a projection optical device configured to project the image light made incident along a second direction from the image generation device; and an exterior housing housing the light source device, the image generation device, and the projection optical device, wherein the projection optical device includes:

an incident side optical path on which the image light is made incident from the image generation device;

a bending member configured to bend the image light having passed through the incident side optical path;

an emission side optical path on which the image light bent by the bending member is made incident;

a reflection element provided on the emission side optical path and configured to reflect the image light made incident thereon and project the image light to an outside of the exterior housing; and a position adjustment device that adjusts a position of a first focus lens on the incident side optical path and a position of a second focus lens on the emission side optical path, the position adjustment device including a first moving frame body that supports the first focus lens and turns centering on a first turning axis and a second moving frame body that supports the second focus lens and turns centering on a second turning axis, and an absolute value of f2/f1 satisfies $11.0 < |f2/f1| < 20.0$ where f1 represents a focal length of the projection optical device that forms an image on the light modulation device and projects the image light and f2 represents a focal length of the reflection element.

9. The projector according to claim 8, wherein the image generation device modulates light made incident in the first direction from the light source device to generate image light and emitting the image light in the second direction, the second direction crossing the first direction, the incident side optical path on which the image light is made incident along the second direction from the image generation device, the bending member configured to bend, in an opposite direction of the first direction, the image light having passed through the incident side optical path, and the emission side optical path on which the image light bent by the bending member is made incident along the opposite direction of the first direction, the emission side optical path being disposed side by side with the light source device in the second direction.

10. A projector comprising:

a light source device configured to emit light in a first direction;

an image generation device including a light modulation device configured to modulate incident light, the image generation device modulating light made incident from the light source device to generate image light and emitting the image light;

a projection optical device configured to project the image light made incident along a second direction from the image generation device; and an exterior housing housing the light source device, the image generation device, and the projection optical device, wherein the projection optical device includes:

an incident side optical path on which the image light is made incident from the image generation device;

a bending member configured to bend the image light having passed through the incident side optical path;

an emission side optical path on which the image light bent by the bending member is made incident;

a reflection element provided on the emission side optical path and configured to reflect the image light made incident thereon and project the image light to an outside of the exterior housing;

an emission side refraction system lens group disposed between the bending member and the reflection element on the emission side optical path;

an incident side refraction system lens group disposed on the incident side optical path; and a position adjustment device that adjusts a position of a first focus lens on the incident side optical path and a position of a second focus lens on the emission side optical path, the position adjustment device including a first moving frame body that supports the first focus lens and turns centering on a first turning axis and a second moving frame body that supports the second focus lens and turns centering on a second turning axis, an absolute value of f2/f1 satisfies $7.0 < |f2/f1| < 15.0$, where f1 represents a focal length of the projection optical device that forms an image on the light modulation device and projects the image light and f2 represents a focal length of the reflection element, and L1/L2 satisfies $1.00 < L1/L2 < 1.35$, where L1 represents a lens length of the emission side refraction system lens group and L2 represents a lens length of the incident side refraction system lens group.

* * * * *